(12) United States Patent  (10) Patent No.: US 9,152,850 B2
Mogi  (45) Date of Patent: Oct. 6, 2015

(54) AUTHENTICATION APPARATUS, AUTHENTICATION METHOD, AND PROGRAM

(71) Applicant: Sony Corporation, Tokyo (JP)

(72) Inventor: Hideaki Mogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 14/019,312

(22) Filed: Sep. 5, 2013

(65) Prior Publication Data

US 2014/0099005 A1  Apr. 10, 2014

(30) Foreign Application Priority Data

Oct. 9, 2012  (JP) .................. 2012-223794

(51) Int. Cl.
  *G06K 9/00*  (2006.01)
(52) U.S. Cl.
  CPC ........ *G06K 9/00288* (2013.01); *G06K 9/00255* (2013.01); *G06K 9/00604* (2013.01); *G06K 9/00892* (2013.01)
(58) Field of Classification Search
  USPC .................................. 382/115–118
  See application file for complete search history.

(56) References Cited

U.S. PATENT DOCUMENTS

| | | | | |
|---|---|---|---|---|
| 5,400,791 A | * | 3/1995 | Schlier et al. ................ | 600/473 |
| 7,123,751 B1 | * | 10/2006 | Fujieda ........................ | 382/115 |
| 2002/0044674 A1 | * | 4/2002 | Pavlidis ....................... | 382/118 |
| 2003/0012413 A1 | * | 1/2003 | Kusakari et al. ............. | 382/117 |
| 2003/0053664 A1 | * | 3/2003 | Pavlidis et al. .............. | 382/117 |
| 2004/0125992 A1 | * | 7/2004 | Aoki et al. ................... | 382/118 |
| 2005/0105778 A1 | * | 5/2005 | Sung et al. ................... | 382/115 |
| 2006/0261931 A1 | * | 11/2006 | Cheng ......................... | 340/426.1 |
| 2008/0212849 A1 | * | 9/2008 | Gao ............................. | 382/118 |
| 2010/0079449 A1 | * | 4/2010 | McCarthy .................... | 345/419 |
| 2010/0141770 A1 | * | 6/2010 | Gomi ........................... | 348/164 |
| 2010/0214532 A1 | * | 8/2010 | Siminou ....................... | 351/206 |
| 2014/0099005 A1 | * | 4/2014 | Mogi ........................... | 382/118 |

FOREIGN PATENT DOCUMENTS

| | | |
|---|---|---|
| JP | 2001-340300 | 12/2001 |
| JP | 2006-148478 | 6/2006 |
| JP | 2007-124676 | 5/2007 |
| JP | 2009-104297 | 5/2009 |
| JP | 2009-201064 | 9/2009 |

* cited by examiner

*Primary Examiner* — Alex Liew

(74) *Attorney, Agent, or Firm* — Michael Best & Friedrich LLP

(57) ABSTRACT

A face authentication procedure is performed on a face detected in a visible light image of a scene, and correctness of an authentication determination of the face authentication procedure is verified by comparing the visible light image to an infrared light image of the same scene. The verification may be performed by comparing the luminance and/or the size of an eye region in the visible light image to the luminance and/or the size of the eye region in the infrared light image.

18 Claims, 19 Drawing Sheets

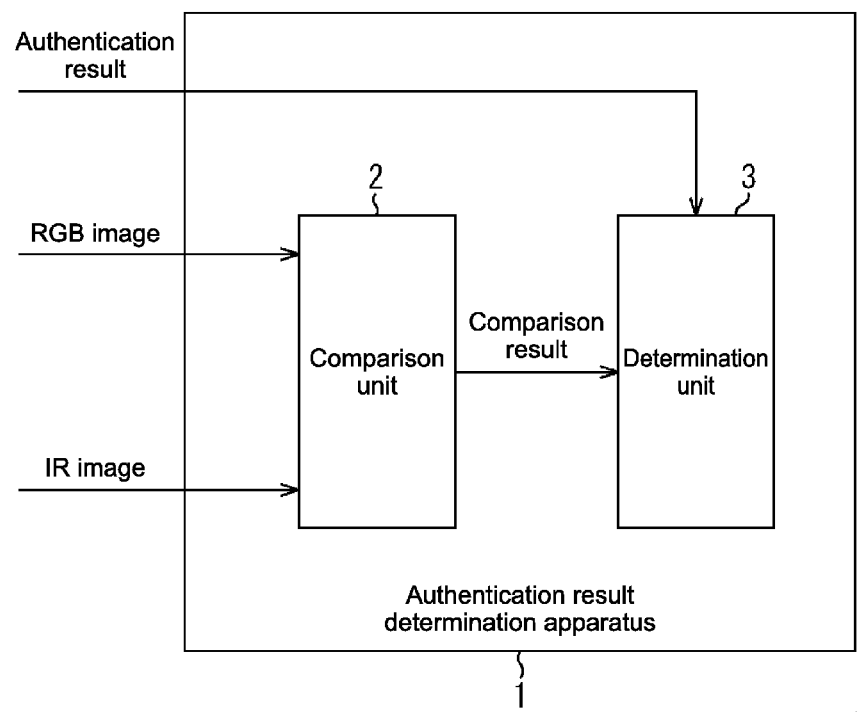
FIG.1
 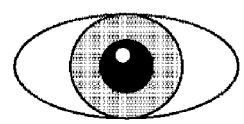
FIG.2A      FIG.2B

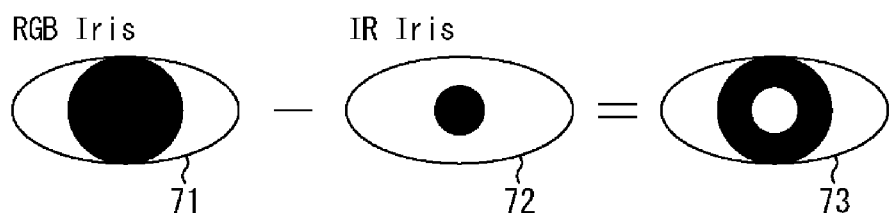
FIG.9
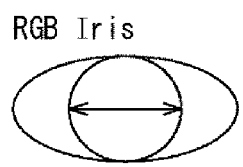 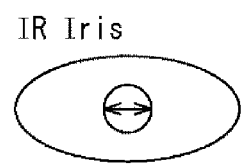
FIG.10A    FIG.10B
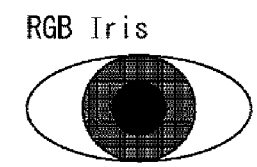
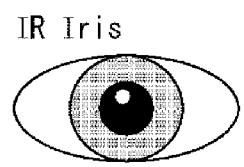
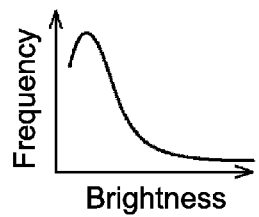
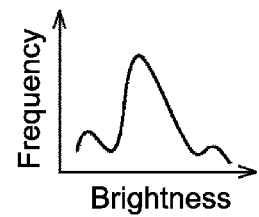
FIG.11A    FIG.11B

AUTHENTICATION APPARATUS, AUTHENTICATION METHOD, AND PROGRAM

BACKGROUND

The present disclosure relates to an authentication apparatus, an authentication method, and a program, and particularly to an authentication apparatus, an authentication method, and a program which are capable of enhancing security by face authentication.

From the past, by image taking with the use of visible light and image taking with the use of infrared light, an object an image of which is to be taken is recognized.

For example, in gesture recognition in a car navigation apparatus, there has been proposed such a technology that, in addition to recognition by using a visible light camera, an infrared ray camera is used to obtain a reflection intensity of infrared light and determine a distance to an object to be recognized, thereby improving accuracy of the gesture recognition (see, for example, Japanese Patent Application Laid-open No. 2009-104297).

Further, in a technology for recognizing road signs or the like with an in-vehicle camera, there has been proposed such a technology that information is extracted from a visible light image obtained by a visible light camera, and information is extracted from an infrared light image obtained by an infrared ray camera by emitting infrared light, thereby improving recognition accuracy (see, for example, Japanese Patent Application Laid-open No. 2009-201064).

Further, there has been proposed such a technology that, by using a solid-state image pickup apparatus provided with a light reception unit in which visible light reception units and non-visible light reception units are alternately arranged for each pixel line in a horizontal direction, non-visible light is emitted when an image-taking target object is recognized to take the image thereof, with the result that the image-taking target object is highlighted, and thus recognition accuracy of white lines or the like on roads is increased (see, for example, Japanese Patent Application Laid-open No. 2007-124676).

Further, there has been proposed such a technology that a visible light image and an infrared light image are obtained, thereby detecting positions of pupils of even a person who is wearing glasses with high accuracy (see, for example, Japanese Patent Application Laid-open No. 2001-340300).

Further, there has been proposed such a technology that a visible light camera using a visible light source and an infrared light camera using an infrared light source are used to take images of blood vessel patterns, and the image taking results are compared with each other, thereby increasing accuracy of biometric authentication (see, for example, Japanese Patent Application Laid-open No. 2006-148478).

SUMMARY

However, a technology for increasing accuracy of face authentication by image taking that uses visible light and image taking that uses infrared light has not been proposed yet.

In view of the above-mentioned circumstances, it is desirable to make it possible to further enhance security by face authentication.

According to a first exemplary illustration of the subject matter of the disclosure, an electronic device may comprise an imaging section comprising at least one image pickup unit. The imaging section may be configured to image a scene and to generate a visible light image of the scene and an infrared light image of the scene. The electronic device may also comprise a face authentication unit configured to perform a face authentication procedure on a face detected in the visible light image. The electronic device may also comprise a verification unit that may be configured to check an authentication determination of the face authentication unit by comparing the visible light image and the infrared light image.

According to a second exemplary illustration of the subject matter of the disclosure, a mobile terminal apparatus may comprise the electronic device of the first exemplary illustration.

According to a third exemplary illustration of the subject matter of the disclosure, a computer system apparatus may comprise the electronic device of the first exemplary illustration.

According to a fourth exemplary illustration of the subject matter of the disclosure, a security system apparatus may comprise the electronic device of the first exemplary illustration.

According to a fifth exemplary illustration of the subject matter of the disclosure, a method of authentication may comprise imaging a scene and generating a visible light image of the scene and an infrared light image of the scene, performing a face authentication procedure on a face detected in the visible light image, and checking a result of said face authentication procedure by comparing luminance data corresponding to an eye region in the visible light image with luminance data corresponding to an eye region in the infrared light image.

According to a sixth exemplary illustration of the subject matter of the disclosure, a non-transitory computer readable medium may have program code stored thereon, the program code being executable by a processor to perform operations which may comprise imaging a scene and generating a visible light image of the scene and an infrared light image of the scene, performing a face authentication procedure on a face detected in the visible light image, and checking an result of said face authentication procedure by comparing luminance data corresponding to an eye region in the visible light image with luminance data corresponding to an eye region in the infrared light image.

According to a seventh exemplary illustration of the subject matter of the disclosure, an electronic device may comprise a face authentication unit that may be configured to perform a face authentication procedure on a face detected in a visible light image of a scene, and a verification unit that may be configured to check an authentication determination of the face authentication unit by comparing the visible light image to an infrared light image of the same scene.

According to the embodiments of the present disclosure, it is possible to enhance the security by the face authentication.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a block diagram showing an example of the functional structure of an authentication result determination apparatus according to the present disclosure;

FIGS. 2A and 2B are diagrams for explaining a difference between an eye region of an RGB image and an eye region of an IR image;

FIG. 9 is a diagram for explaining an example of comparison between an eye region in the RGB pixel and an eye region in the IR pixel;

FIGS. 10A and 10B are diagrams for explaining an example of comparison between the eye region in the RGB pixel and the eye region in the IR pixel;

FIGS. 11A and 11B are diagrams for explaining an example of comparison between the eye region in the RGB pixel and the eye region in the IR pixel;

DETAILED DESCRIPTION OF EMBODIMENTS

Figure 3A:
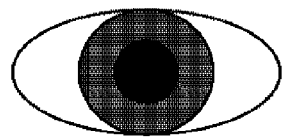
FIGS. 3A and 3B are diagrams for explaining a difference between an eye region of an RGB image and an eye region of an IR image.

Hereinafter, embodiments of the present disclosure will be described with reference to the drawings. It should be noted that the description will be given in the following order.

1. Outline of present disclosure
2. First embodiment
3. Second embodiment
4. Third embodiment
5. Fourth embodiment
6. Fifth embodiment
7. Sixth embodiment
8. Seventh embodiment 1. Outline of Present Disclosure (Example of Functional Structure of Authentication Result Determination Apparatus)

FIG. 1 is a diagram showing an example of the functional structure of an authentication result determination apparatus as an authentication apparatus to which the present disclosure is applied.

An authentication result determination apparatus shown in FIG. 1 is included in a face authentication apparatus that authenticates a person's face or is connected to the face authentication apparatus, to determine whether an authentication result of the face authentication apparatus is correct or not.

The authentication result determination apparatus 1 includes a comparison unit 2 and a determination unit 3.

The comparison unit 2 compares a visible light image (hereinafter, referred to as RGB image) with an infrared light image (hereinafter, referred to as IR image) which are obtained by shooting of a person who is subjected to face authentication by the face authentication apparatus. Specifically, the comparison unit 2 compares an eye part (hereinafter, referred to as eye region) of a person in the RGB image in which the person irradiated with infrared light from a predetermined infrared light source is used as a subject with an eye region of the person in the IR image in which the person is used as the subject, and supplies a comparison result to the determination unit 3. A visible light image is an image generated primarily from visible light, while an infrared image is an image generated primarily from infrared light. "Visible light" means light having wavelengths in the range from about 380 nm to about 750 nm. "Infrared light" means light having wavelengths in the range from about 700 nm to about 2500 nm. In the present disclosure, infrared light preferably from 780 nm to 940 nm, and more preferably from 850 nm to 940 nm may be used.

The person in the RGB image and the person in the IR image are of course the identical person.

On the basis of the comparison result from the comparison unit 2, the determination unit 3 determines whether the authentication result of the face authentication that is performed for the above-mentioned person by the face authentication apparatus is correct or not. Specifically, the determination unit 3 determines whether the authentication result of the face authentication is correct or not on the basis of a difference between the eye region in the RGB image and the eye region in the IR image.

Here, with reference to FIGS. 2 and 3, the difference between the eye regions in the RGB image and the IR image will be described.

Figure 3B:
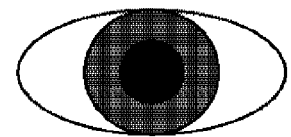

FIGS. 2A and 2B show an eye region of an RGB image and an eye region of an IR image, respectively, in the case where an actual person was the subject of imaging. FIGS. 3A and 3B show an eye region of an RGB image and an eye region of an IR image, respectively, in the case where a likeness of a person was the subject of imaging, for example when a picture of the person was the subject of imaging or the like.

As shown in FIG. 2, the eye region in the RGB image and the eye region in the IR image are differently observed in the case where the image of the actual person is taken. Specifically, in the eye region in the RGB image in the case where the image of the actual person is taken, a contrast difference between a pupil and an iris (in the case where the color of the iris is dark) is not large. However, in the eye region in the IR image in the case where the image of the actual person is taken, the iris is brightly shown, and the contrast difference between the pupil and the iris is larger. Further, in the eye region in the IR image in the case where the image of the actual person is taken, a Purkinje image, which is an image generated by reflecting an infrared light source for emitting infrared light on a cornea, is observed.

On the other hand, as shown in FIG. 3, the eye region in the RGB image and the eye region in the IR image in the case where a picture or the like is the subject of imaging are similarly observed. Further, in the eye region of the IR image in the case where the image of the person in the picture or the like is taken, the Purkinje image is not observed.

That is, as a result of the comparison by the comparison unit 2, in the case where there is a difference between the eye region of the RGB image and the eye region of the IR image, the subject in the RGB image and the IR image is an actual person, and in the case where there is no difference between the eye region of the RGB image and the eye region of the IR image, the subject in the RGB image and the IR image is not an actual person but a person shown in a picture or the like.

Thus, in the case where an authentication result that shows authentication OK is supplied from the face authentication apparatus, if the comparison result from the comparison unit 2 shows that there is a difference between the eye region of the RGB image and the eye region of the IR image, the authentication by the face authentication apparatus is performed for an actual person's face. Therefore, the determination unit 3 determines that the authentication result is correct and outputs the authentication result to a display apparatus (not shown) or the like. Further, in the case where the authentication result that shows authentication OK is supplied from the face authentication apparatus, if the comparison result from the comparison unit 2 shows that there is no difference between the eye region of the RGB image and the eye region of the IR image, the authentication by the face authentication apparatus is performed for a face shown in a picture or the like. Thus, the determination unit 3 determines that the authentication result is not correct and outputs the fact that the authentication result is not correct.

It should be noted that in the case where the authentication result that shows authentication N/A (non-acceptance) is supplied from the face authentication apparatus, the determination unit 3 outputs the authentication result as it is.

(About Authentication Result Determination Process)

Figure 4:
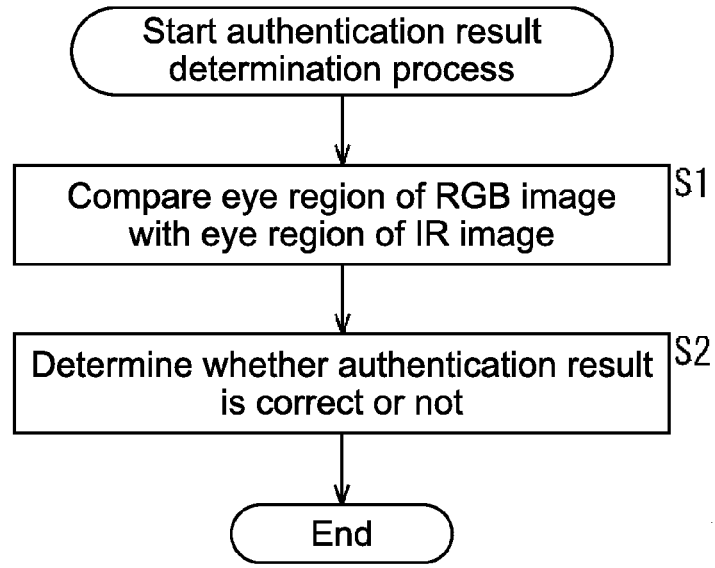
FIG. 4 is a flowchart for explaining an authentication result determination process.

Here, with reference to a flowchart shown in FIG. 4, an authentication result determination process by the authentication result determination apparatus 1 will be described.

In Step S1, the comparison unit 2 compares an eye region of a person in the RGB image in which the person irradiated with infrared light is shown as a subject with an eye region of the person in the IR image in which the same person is shown as a subject and supplies the comparison result to the determination unit 3.

In Step S2, on the basis of the comparison result from the comparison unit 2, that is, a difference between the eye region in the RGB image and the eye region in the IR image, as described above with reference to FIGS. 2 and 3, the determination unit 3 determines whether the authentication result of the face authentication is correct or not and outputs the determination result. As described above, in the case where it is determined that the authentication result is correct, the authentication result is output, and in the case where it is determined that the authentication result is not correct, the fact that the authentication result is not correct is output.

Through the process described above, the eye region in the RGB image and the eye region in the IR image are compared with each other, and whether the authentication result of the face authentication is correct or not is determined on the basis of the comparison result. Thus, it is possible to increase the accuracy of the face authentication by image taking that uses visible light and image taking that uses infrared light, and therefore it is possible to enhance the security by the face authentication.

Hereinafter, embodiments of the present disclosure will be described.

2. First Embodiment (Example of Hardware Structure of Mobile Terminal)

Figure 5:
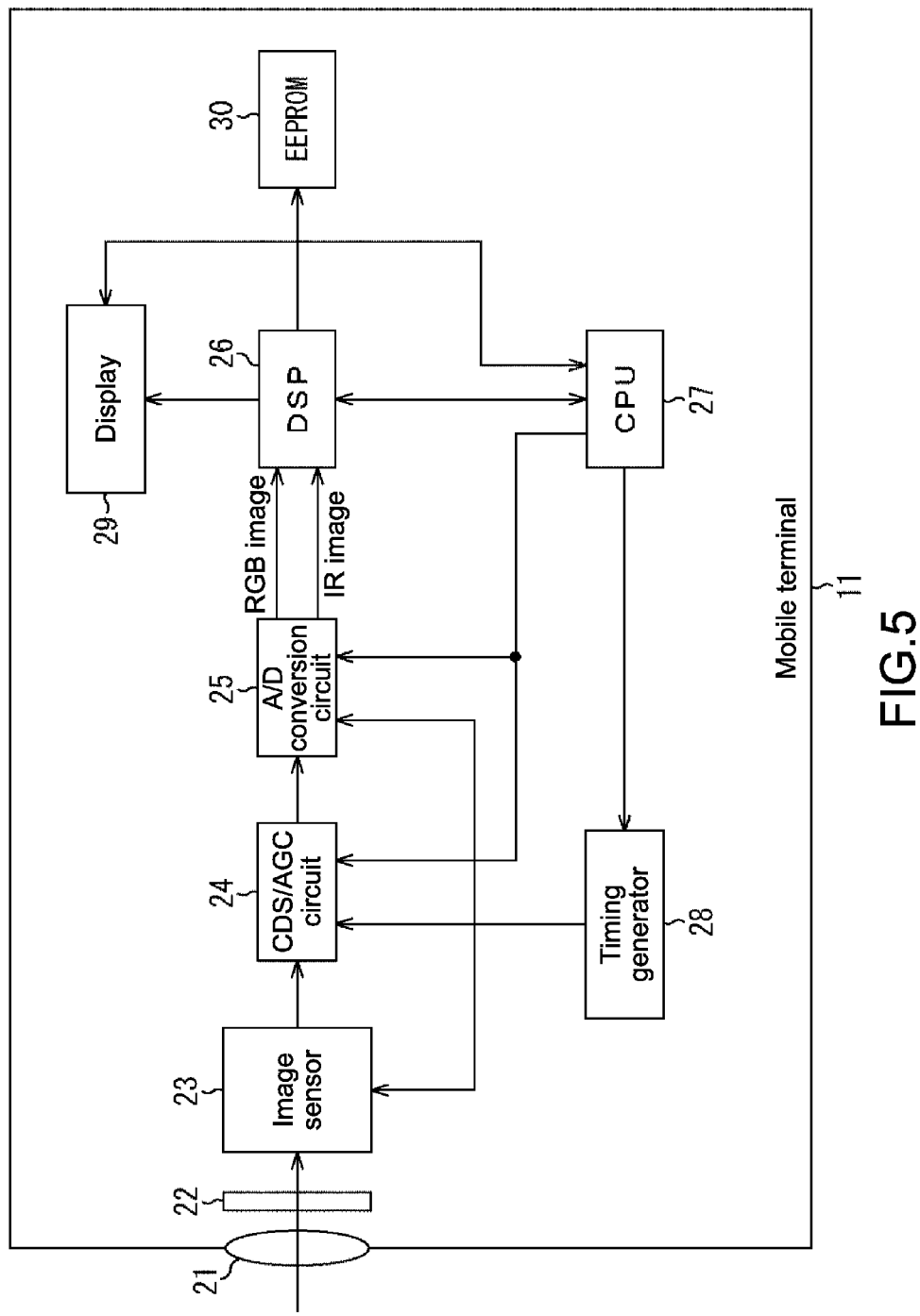
FIG. 5 is a block diagram showing an example of the hardware structure of a mobile terminal as an embodiment of the present disclosure.

FIG. 5 is a block diagram showing an example of the hardware structure of a mobile terminal as the authentication apparatus to which the present disclosure is applied.

A mobile terminal 11 shown in FIG. 5 is, for example, a mobile phone having an image pickup function and takes an image of a person as a subject, thereby performing the face authentication for the person to unlock a security lock.

The mobile terminal 11 shown in FIG. 5 is constituted of a lens 21, a special filter 22, an image sensor 23, a CDS/AGC (correlated double sampling/automatic gain control) circuit 24, an A/D (analog/digital) conversion circuit 25, a DSP (digital signal processor) 26, a CPU (central processing unit) 27, a timing generator 28, a display 29, and an EEPROM (electrically erasable programmable read only memory) 30.

The lens 21 is formed as a monocular single focus lens, and the lens collects light from a subject and causes the light corrected to enter the image sensor 23 via the special filter 22. The image sensor 23 is formed of a CCD (charge coupled device), a CMOS (complementary metal oxide semiconductor) sensor, or the like, and the image sensor receives light that is incident thereon from the lens 21 through the special filter 22, performs photoelectric conversion for the light to obtain an image signal (analog signal) as an electrical signal, and supplies the signal to the CDS/AGC circuit 24.

The special filter 22 has spectral characteristics with a transmission band in a wavelength region of near-infrared light. On a front surface of the image sensor 23 (left side in the figure), a color filter array 23a (FIG. 6) is disposed. The color filter array 23a is constituted of color filters allocated for each pixel of the image sensor 23.

Figure 6:
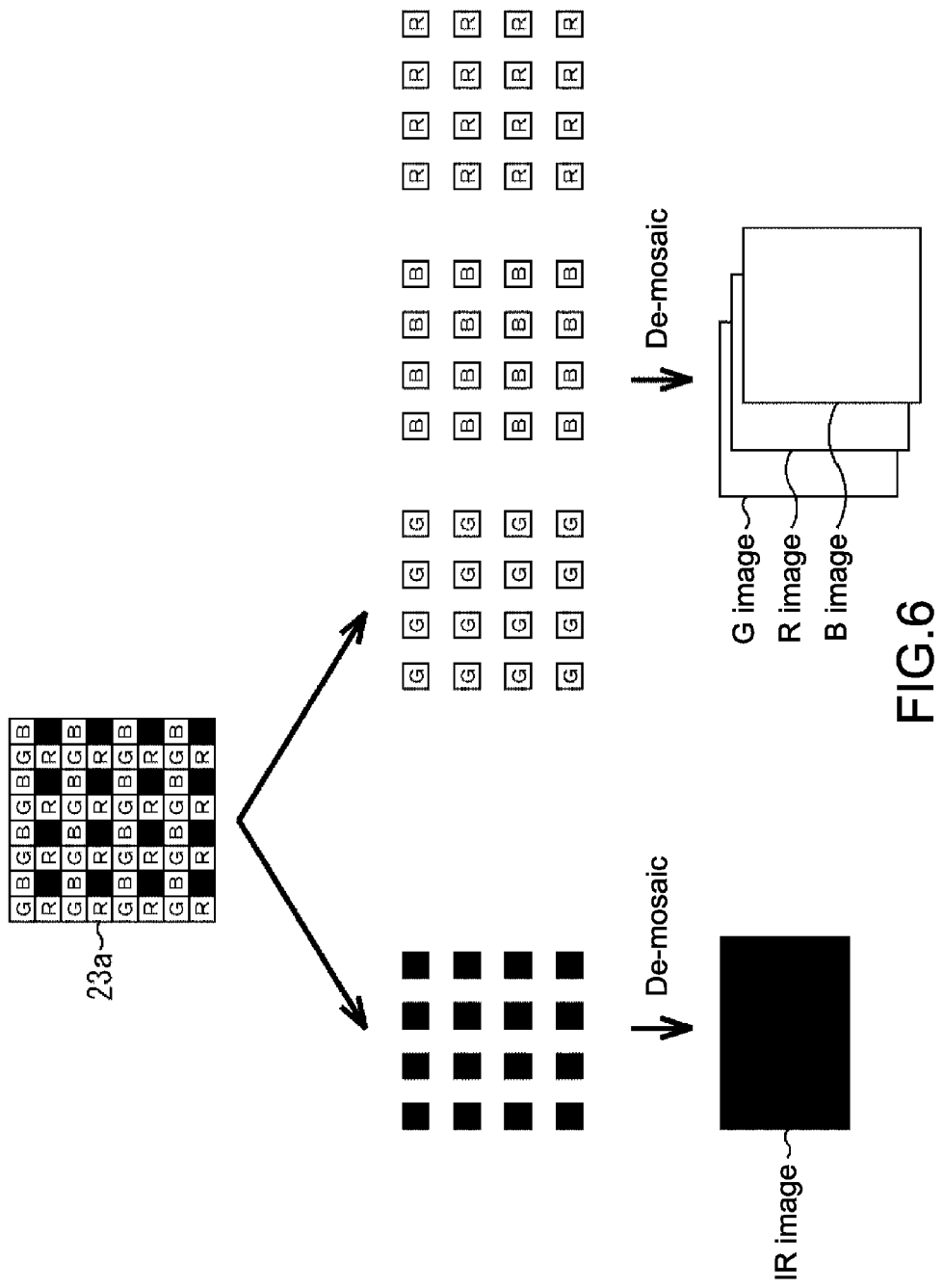
FIG. 6 is a diagram for explaining an example of outputs of RGB pixels and IR pixels.

FIG. 6 shows an example of an arrangement of the color filter array 23a in which a half of G pixels (one G pixel out of adjacent 2×2 (=4) pixels constituted of R, G, B, and G) is formed of IR (infrared) transmission filters in Bayer arrangement, which are indicated by being blacked out in the figure.

That is, as shown in FIG. 6, by the image sensor 23, a visible light image (RGB image) formed of R images, G images, and B images obtained by performing de-mosaic for an output in which R, Gb (or Gr), and B pixels (RGB pixels) are extracted is generated, and an infrared light image (IR image) obtained by performing de-mosaic for an output in which the Gr (or Gb) pixels (IR pixels) are extracted is generated.

With reference to FIG. 5 again, the CDS/AGS circuit 24 removes a 1/f noise generated in the image sensor 23 and, on the basis of the control by the CPU 27, adjust a gain so that a level of an image signal supplied from the image sensor 23 becomes constant to output the gain adjusted to the A/D conversion circuit 25. Further, the CDS/AGS circuit 24 also performs an electronic shutter process for electrically changing an accumulation time period of charges in the image sensor 23 on the basis of the control of the CPU 27.

A/D conversion circuit 25 converts an image signal as an analog signal output from the CDS/AGS circuit 24 into image data as a digital signal and supplies the image data to the DSP 26. Examples of the image data obtained by the A/D conversion circuit 25 include image data of the RGB image described above and image data of the IR image described above.

The DSP 26 performs a predetermined image process for the image data (image data of the RGB image and the IR image) from the A/D conversion circuit 25 and supplies a result of the image process to the display 29 or the EEPROM 30.

The CPU 27 controls the units of the mobile terminal 11.

On the basis of the control by the CPU 27, the timing generator 28 generates various timing signals and supplies the signals to the image sensor 23, the CDS/AGS circuit 24, and the A/D conversion circuit 25.

On the basis of the control by the CPU 27, the display 29 displays a predetermined image or performs display in accordance with the result of the image process from the DSP 26. Further, the display 29 has a touch panel function and performs a display of an operation screen for performing an operation input with respect to the mobile terminal 11.

The EEPROM 30 is a so-called non-volatile memory. If a power supply is stopped, the EEPROM 30 stores and holds various setting parameters, a result of the image process from the DSP 26, or the like without losing information stored.

(Example of Functional Structure of Mobile Terminal)

Subsequently, with reference to FIG. 7, an example of the functional structure of the mobile terminal 11 will be described.

Figure 7:
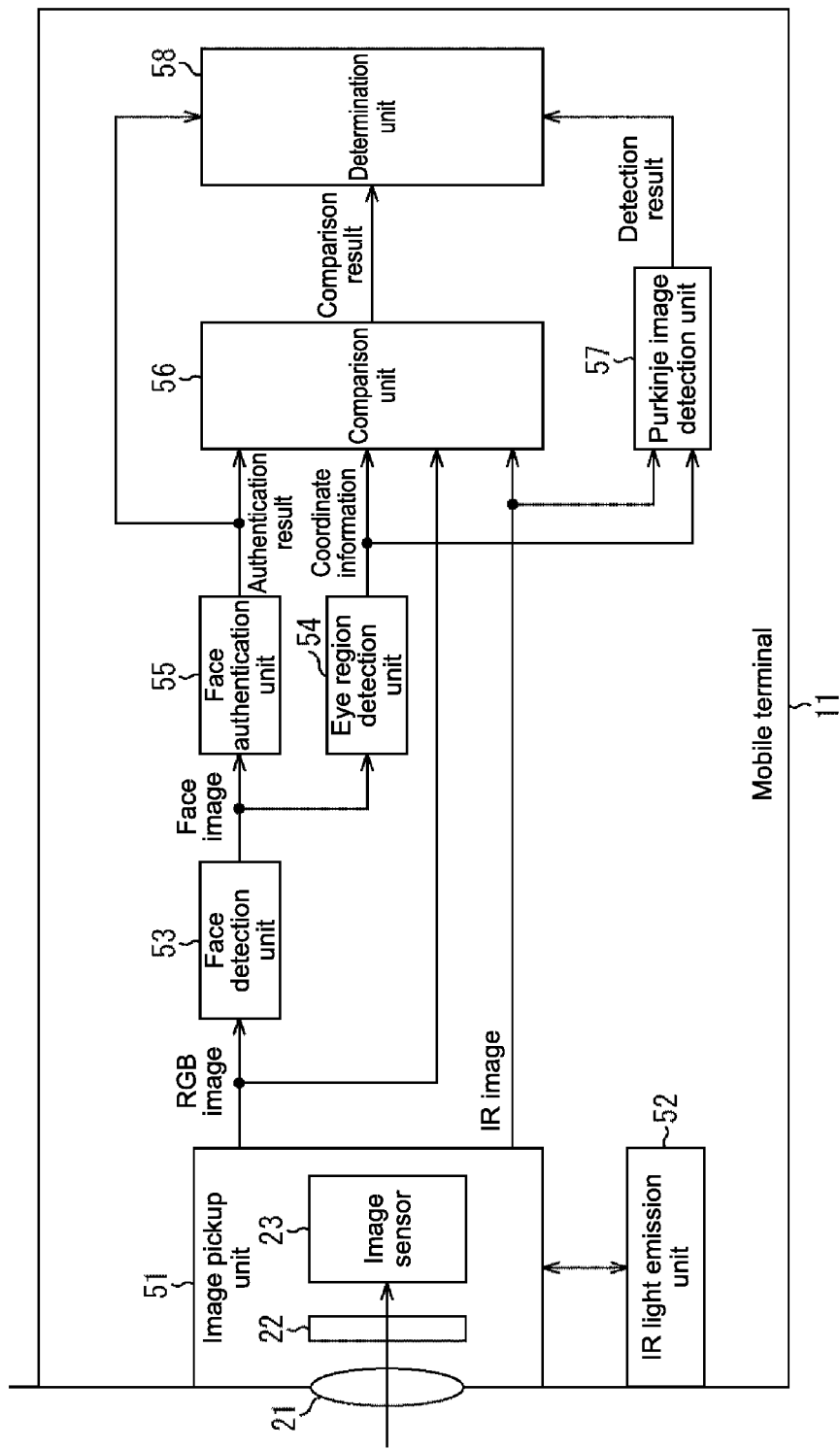
FIG. 7 is a block diagram showing an example of the functional structure of a mobile terminal according to a first embodiment of the present disclosure.

The mobile terminal 11 shown in FIG. 7 is constituted of an image pickup unit 51, an IR light emission unit 52, a face detection unit 53, an eye region detection unit 54, a face authentication unit 55, a comparison unit 56j, a Purkinje image detection unit 57, and a determination unit 58.

The image pickup unit 51 is provided with the lens 21, the special filter 22, and the image sensor 23 described with reference to FIG. 2 and further provided with the CDS/AGC circuit 24 and the A/D conversion circuit 25. That is, the image pickup unit 51 takes an image of a subject and outputs the RGB image and the IR image at the same time. Further, the image pickup unit 51 performs a gain adjustment and an electronic shutter process.

The IR light emission unit 52 is synchronized with the image pickup unit 51 by the timing signal of the timing generator 28 to emit infrared light at timing when the image pickup unit 51 takes an image of a subject, thereby irradiating the subject with the infrared light. It should be noted that the IR light emission unit 52 may emit infrared light constantly without being synchronized with the image pickup unit 51.

The face detection unit 53 detects a face from the RGB image from the image pickup unit 51, extracts a face image on the basis of a position and a size of a face detection region, which is a region where the face is detected, and supplies the face image to the eye region detection unit 54 and the face authentication unit 55. For example, the face detection unit 53 learns face images of a plurality of faces in advance, thereby detecting a person's face as the subject of the RGB image.

The eye region detection unit 54 extracts the eye region in the face image from the face detection unit 53 and supplies information (coordinate information) that indicates the position of the eye region in the RGB image to the comparison unit 56 and the Purkinje image detection unit 57. For example, the eye region detection unit 54 learns images of a plurality of eyes in advance, thereby detecting the eye regions.

The face authentication unit 55 performs face authentication with respect to the person in the RGB image by using the face image from the face detection unit 53 and supplies the authentication result to the comparison unit 56 and the determination unit 58. For example, the face authentication unit 55 performs matching between the face image from the face detection unit 53 and the face image of an owner of the mobile terminal 11 registered in advance, thereby performing the face authentication.

In the case where the authentication result that indicates the authentication OK is supplied from the face authentication unit 55, the comparison unit 56 uses the coordinate information from the eye region detection unit 54 to compare the eye region of the RGB image and the eye region of the IR image and supplies the comparison result to the determination unit 58.

The Purkinje image detection unit 57 uses the coordinate information from the eye region detection unit 54 to detect a Purkinje image in the eye region of the IR image from the image pickup unit 51 and supplies the detection result to the determination unit 58.

The determination unit 58 uses the comparison result from the comparison unit 56 and the detection unit from the Purkinje image detection unit 57 to determine whether the authentication result from the face authentication unit 55 is correct or not and outputs the determination result to the display 29.

(About Authentication Process)

Next, with reference to a flowchart of FIG. 8, an authentication process by the mobile terminal 11 will be described.

For example, when an operator inputs an operation to start the authentication process, in Step S11, the image pickup unit 51 takes an image of the operator as a subject. Here, at the timing when the image pickup unit 51 takes the image, the IR light generation unit 52 emits light. As a result, the RGB image and the IR image in which the operator irradiated with the infrared light is the subject are obtained. The RGB image is supplied to the face detection unit 53 and the comparison unit 56, and the IR image is supplied to the comparison unit 56 and the Purkinje image detection unit 57.

In Step S12, the face detection unit 53 detects a face in the RGB image from the image pickup unit 51, extracts a face image on the basis of the position and the size of the face detection region, and supplies the face image to the face region detection unit 54 and the face authentication unit 55.

In Step S13, the eye region detection unit 54 detects the eye region in the face image from the face detection unit 53 and supplies the coordinate information that indicates the position of the eye region in the RGB image to the comparison unit 56 and the Purkinje image detection unit 57. The detection of the eye region may be performed for each of the left eye and the right eye or for either one of the eyes.

In Step S14, the face authentication unit 55 uses the face image from the face detection unit 53 to perform the face authentication with respect to the operator in the RGB image obtained by the image pickup unit 51.

It should be noted that the processes of Steps S13 and S14 may be performed in parallel.

In Step S15, in the case where the authentication result of the face authentication shows the authentication OK, the face authentication unit 55 supplies the authentication result to the comparison unit 56 and the determination unit 58, and the process proceeds to Step S16.

In Step S16, when obtaining the authentication result from the face authentication unit 55, the comparison unit 56 uses the coordinate information from the eye region detection unit 54 to compare the eye region in the RGB image and the eye region in the IR image and supplies the comparison result to the determination unit 58. It should be noted that the coordinate information from the eye region detection unit 54 indicates the position of the eye region in the RGB image. The RGB image obtained by the image pickup unit 51 is taken at the same field angle at the same time as the IR image, so the position of the eye region in the IR image is also specified from the coordinate information from the eye region detection unit 54.

That is, the comparison unit 56 compares the eye region in the RGB image and the eye region in the IR image which are specified by the coordinate information from the eye region detection unit 54.

Specifically, for example, as shown in FIG. 9, the comparison unit 45 obtains a difference between a binarized eye region image 71 obtained by performing binarization for brightness information of the eye region in the RGB image by using a predetermined threshold value and a binarized eye region image 72 obtained by performing binarization for brightness information of the eye region in the IR image by using a predetermined threshold value, thereby obtaining a differential image 73.

The eye region in the RGB image and the eye region in the IR image in the case where an image of an actual person is taken have different brightness in the pupil and the iris, so the differential image 73 is an image having a value in an iris part.

On the other hand, the eye region in the RGB image and the eye region in the IR image in the case where an image of a person in a picture or the like is taken have the same brightness in the pupil and the iris, so the differential image 73 is an image having no value entirely.

It should be noted that there is an individual difference in brightness (color) of the iris, so a threshold value used for the binarization process may be set for each country, region, or the like.

In addition, as shown in FIG. 10, the comparison unit 56 may obtain a difference between an outline of a black region in the eye region in the RGB image and an outline of a black region in the eye region in the IR image.

In the eye region in the RGB image in the case here an image of the actual person is taken, the pupil and iris portions are the black region, and in the eye region in the IR image in the case where the image of the actual person is taken, only the pupil is the black region. Therefore, in the case where the image of the actual person is taken, there is a difference between a diameter (FIG. 10A) of the outline of the black region in the eye region in the RGB image and a diameter (FIG. 10B) of the outline of the black region in the eye region in the IR image.

On the other hand, in the case where the image of the person in the picture or the like is taken, in the eye region in the RGB image, the pupil and iris portions are the black region, and also in the eye region in the IR image in the same case, the pupil and iris portions are the black region. Therefore, in the case where the image of the person in the picture or the like is taken, there is no difference between a diameter of the outline of the black region in the eye region in the RGB image and a diameter of the outline of the black region in the eye region in the IR image.

It should be noted that the black regions in the eye regions of the RGB image and the IR image can be obtained by the binarization process described above.

Further, as shown in FIG. 11, the comparison unit 56 may obtain a difference between a brightness distribution in the eye region in the RGB image and a brightness distribution in the eye region in the IR image.

In the eye region in the RGB image in the image of the actual person is taken, the pupil and iris portions have dark color, so a low brightness side in the brightness distribution becomes larger. In the eye region in the IR image in the image of the actual person is taken, the iris portion has bright color, so a high brightness side in the brightness distribution becomes larger. Therefore, in the case where the image of the actual person is taken, there is a difference between a brightness histogram (FIG. 11A) for the eye region in the RGB image and a brightness histogram (FIG. 11B) for the eye region in the IR image.

On the other hand, in the eye region in the RGB image in the case where the image of the person in the picture or the like is taken, the pupil and iris portions have dark color, so a low brightness side in the brightness distribution becomes larger, and also in the eye region in the IR image in the same case, the pupil and iris portions have dark color, so a low brightness side in the brightness distribution becomes larger. Therefore, in the case where the image of the person in the picture or the like is taken, there is no difference between the brightness histogram for the eye region in the RGB image and the brightness histogram for the eye region in the IR image.

In this way, the comparison unit 56 can compare the eye region in the RGB image and the eye region in the IR image and obtain the difference therebetween. The method of obtaining the difference is not limited to the method described above.

With reference to the flowchart of FIG. 8 again, in Step S17, the Purkinje image detection unit 57 detects a Purkinje image in the eye region specified on the basis of the coordinate information from the eye region detection unit 54 in the IR image from the image pickup unit 51 and supplies the detection result to the determination unit 58. Specifically, if the IR image from the image pickup unit 51 is the IR image in the case where the image of the actual person is taken, the Purkinje image is detected from the eye region. If the IR image from the image pickup unit 51 is the IR image in the case where the image of the person in the picture or the like is taken, the Purkinje image is not detected from the eye region.

In Step S18, on the basis of the comparison result from the comparison unit 56 and the detection result from the Purkinje image detection unit 57, the determination unit 58 determines whether the authentication result from the face authentication unit 55 or not, and process proceeds to Step S19.

That is, when the comparison result from the comparison unit 56 shows that there is the difference between the eye region in the RGB image and the eye region in the IR image, and when the detection result from the Purkinje image detection unit 57 shows that the Purkinje image is detected from the eye region in the IR image, the person that has been subjected to the face authentication is the actual person, so the determination unit 58 determines that the authentication result (authentication OK) is correct.

In addition, when the comparison result from the comparison unit 56 shows that there is no difference between the eye region in the RGB image and the eye region in the IR image, or when the detection result from the Purkinje image detection unit 57 shows that the Purkinje image is not detected from the eye region in the IR image, the person that has been subjected to the face authentication is the person shown in the picture or the like, so the determination unit 58 determines that the authentication result (authentication OK) is not correct.

Incidentally, in Step S15, in the case where the authentication result of the face authentication shows authentication N/A, the face authentication unit 55 supplies the authentication result to the determination unit 58, and the process proceeds to Step S19.

In Step S19, the determination unit 58 outputs the authentication result to the display 29.

Specifically, in the case where it is determined that the authentication result (authentication OK) is correct in Step S18, the determination unit 58 outputs the fact that the authentication OK is determined to the display 29. At this time, the security lock for the mobile terminal 11 is unlocked.

On the other hand, in the case where it is determined that the authentication result (authentication OK) is not correct in Step S18, the determination unit 58 outputs the fact that the authentication is failed to the display 29. In this case, the security lock for the mobile terminal 11 is not unlocked.

Further, in the case where the result of the face authentication shows the authentication N/A in Step S15, the determination unit 58 outputs the fact that the authentication N/A is determined to the display 29. In this case, of course, the security lock for the mobile terminal 11 is not unlocked.

Through the above-described process, the eye region in the RGB image and the eye region in the IR image are compared to each other, and whether the authentication result of the face authentication is correct or not is determined on the basis of the comparison result.

In an authentication process in related art, for example, there is a fear that a picture of a face of a mobile terminal owner is used to succeed in face authentication by spoofing, and security lock may be unlocked. On the contrary, in the present disclosure, the eye region in the RGB image and the eye region in the IR image are compared to each other, with the result that even if the face authentication succeeds by spoofing by using a face picture, it is determined that the authentication result is not correct. Thus, according to the present disclosure, by the image taking that uses visible light and the image taking that uses infrared light, it is possible to increase the accuracy of the face authentication and enhance the security by the face authentication.

In addition, in the process described above, the RGB image and the IR image are taken by one image pickup unit at the same field angle at the same time, so it is unnecessary to adjust an optical axis or synchronize the image pickup timing, for example, which can reduce a load of a process.

In the above description, the eye region is detected from the face image, but the eye region may be detected from the entire RGB image as long as the eye region can be detected with high accuracy.

3. Second Embodiment (Example of Functional Structure of Mobile Terminal)

Figure 12:
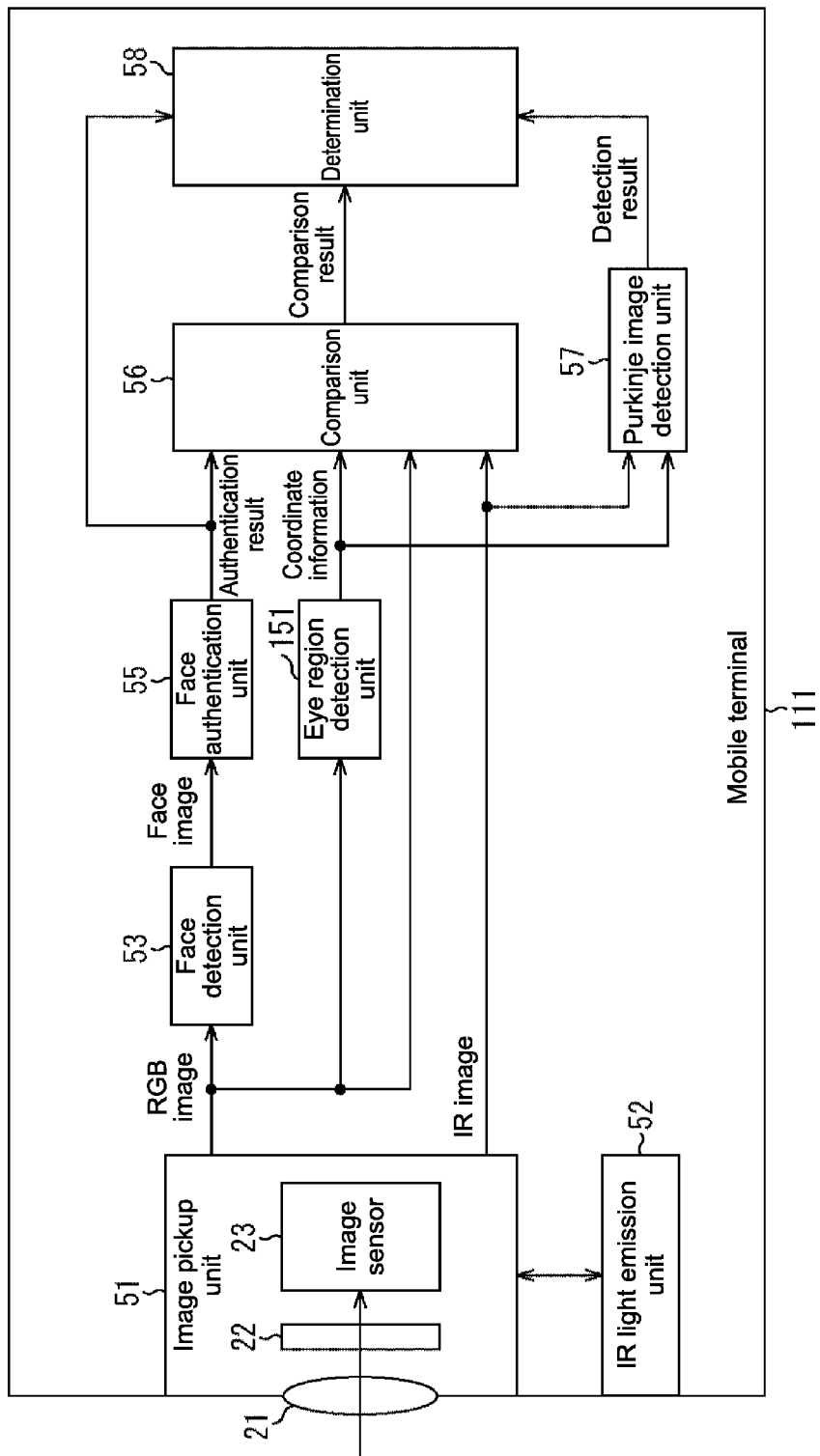
FIG. 12 is a block diagram showing an example of the functional structure of a mobile terminal according to a second embodiment of the present disclosure.

FIG. 12 is a diagram showing an example of the functional structure of a mobile terminal according to a second embodiment of the present disclosure.

It should be noted that in a mobile terminal 111 shown in FIG. 12, structures having the same functions as those in the mobile terminal 11 shown in FIG. 7 are denoted by the same names and reference numerals, and description thereof will be omitted as appropriate.

The mobile terminal 111 shown in FIG. 12 is different from the mobile terminal 11 shown in FIG. 7 in that an eye region detection unit 151 is provided instead of the eye region detection unit 54.

The eye region detection unit 151 detects an eye region from an RGB image from the image pickup unit 51 and supplies coordinate information that indicates a position of the eye region in the RGB image to the comparison unit 56 and the Purkinje image detection unit 57. The eye region detection unit 151 learns a plurality of eyes in advance, thereby detecting the eye region.

(About Authentication Process)

Subsequently, with reference to a flowchart shown in FIG. 13, an authentication process by the mobile terminal 111 shown in FIG. 12 will be described.

Figure 8:
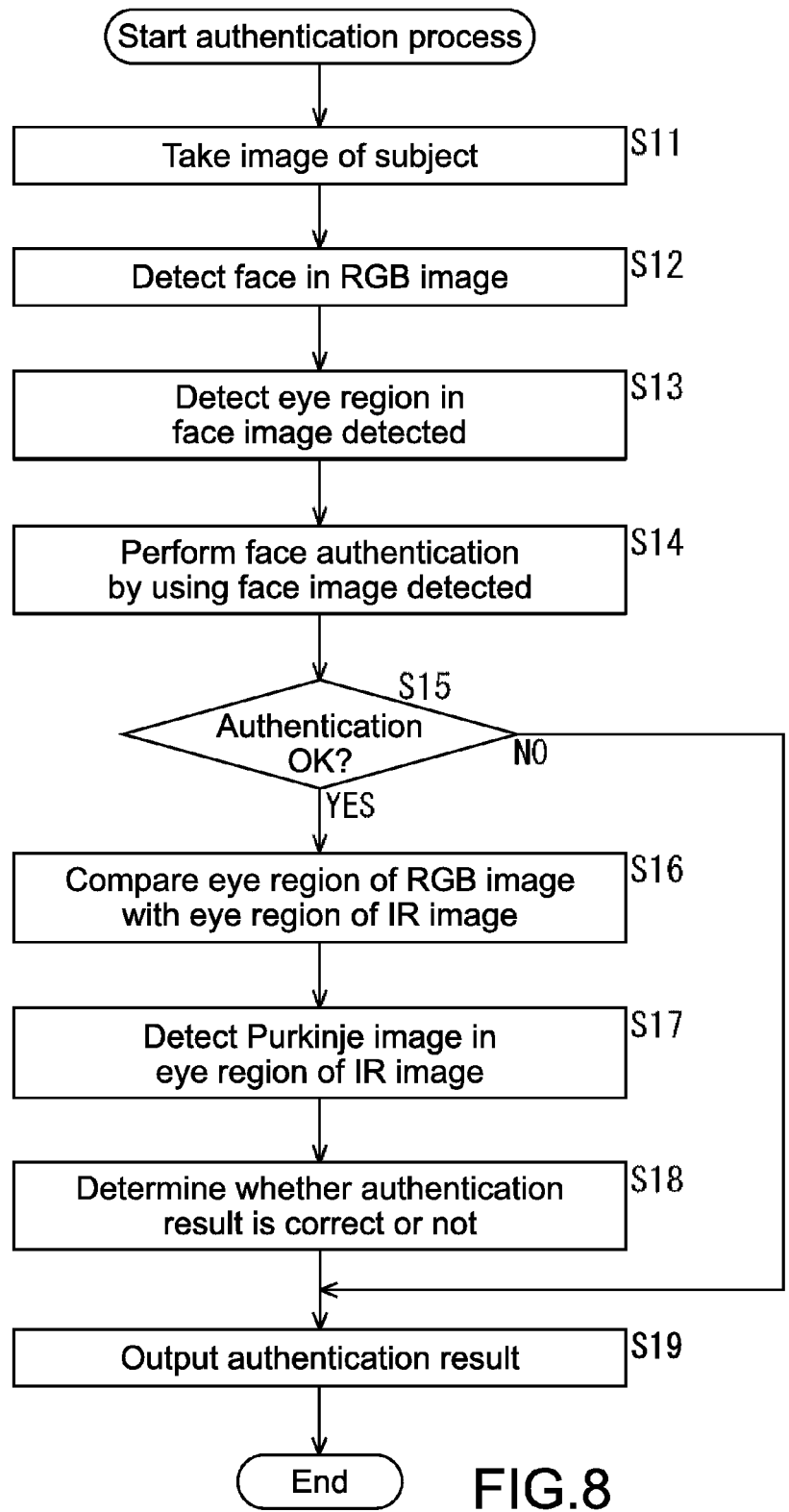
FIG. 8 is a flowchart for explaining an authentication process by the mobile terminal of FIG. 7.
Figure 13:
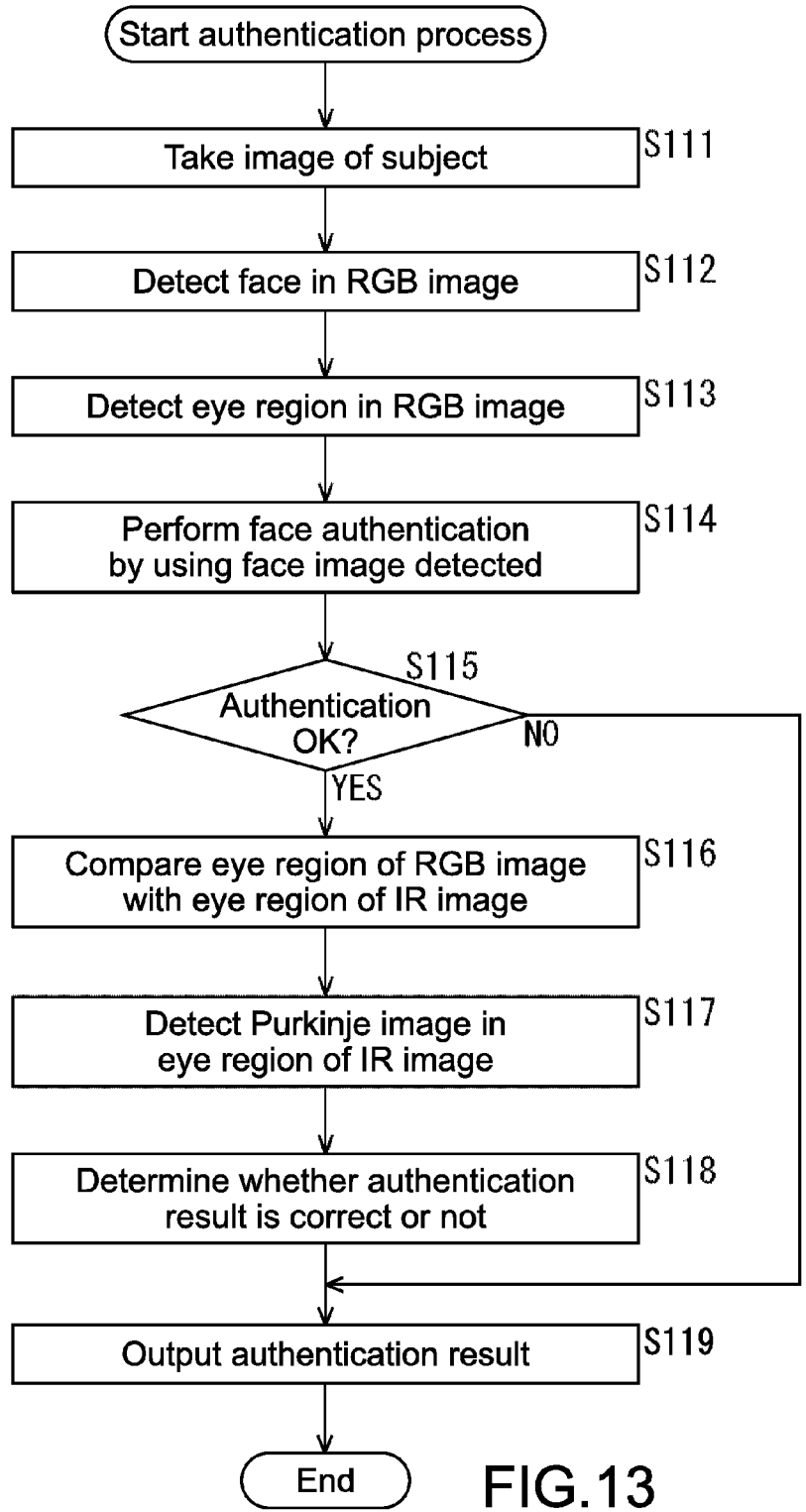
FIG. 13 is a flowchart for explaining an authentication process by the mobile terminal of FIG. 12.

It should be noted that the processes of Steps S111, S112, and S114 to S119 of the flowchart shown in FIG. 13 are basically the same as the processes of Steps S11, S12, and S14 to S19 of the flowchart shown in FIG. 8, so the description thereof will be omitted.

That is, in Step S113, the eye region detection unit 151 detects the eye region in the RGB image obtained by the image pickup unit 51 and supplies coordination information that indicates the position of the eye region in the RGB image to the comparison unit 56 and the Purkinje image detection unit 57. The detection of the eye region may be performed for each of the left eye and the right eye or for either one of the eyes.

Through the above process, the eye region in the RGB image and the eye region in the IR image are compared to each other, and whether the authentication result of the face authentication is correct or not is determined on the basis of the comparison result, so by the image taking that uses visible light and the image taking that uses infrared light, it is possible to increase the accuracy of the face authentication and further enhance the security by the face authentication.

In the above description, the eye region is detected from the entire RGB image, but the eye region may be detected from the entire IR image.

4. Third Embodiment (Example Of Functional Structure Of Mobile Terminal)

Figure 14:
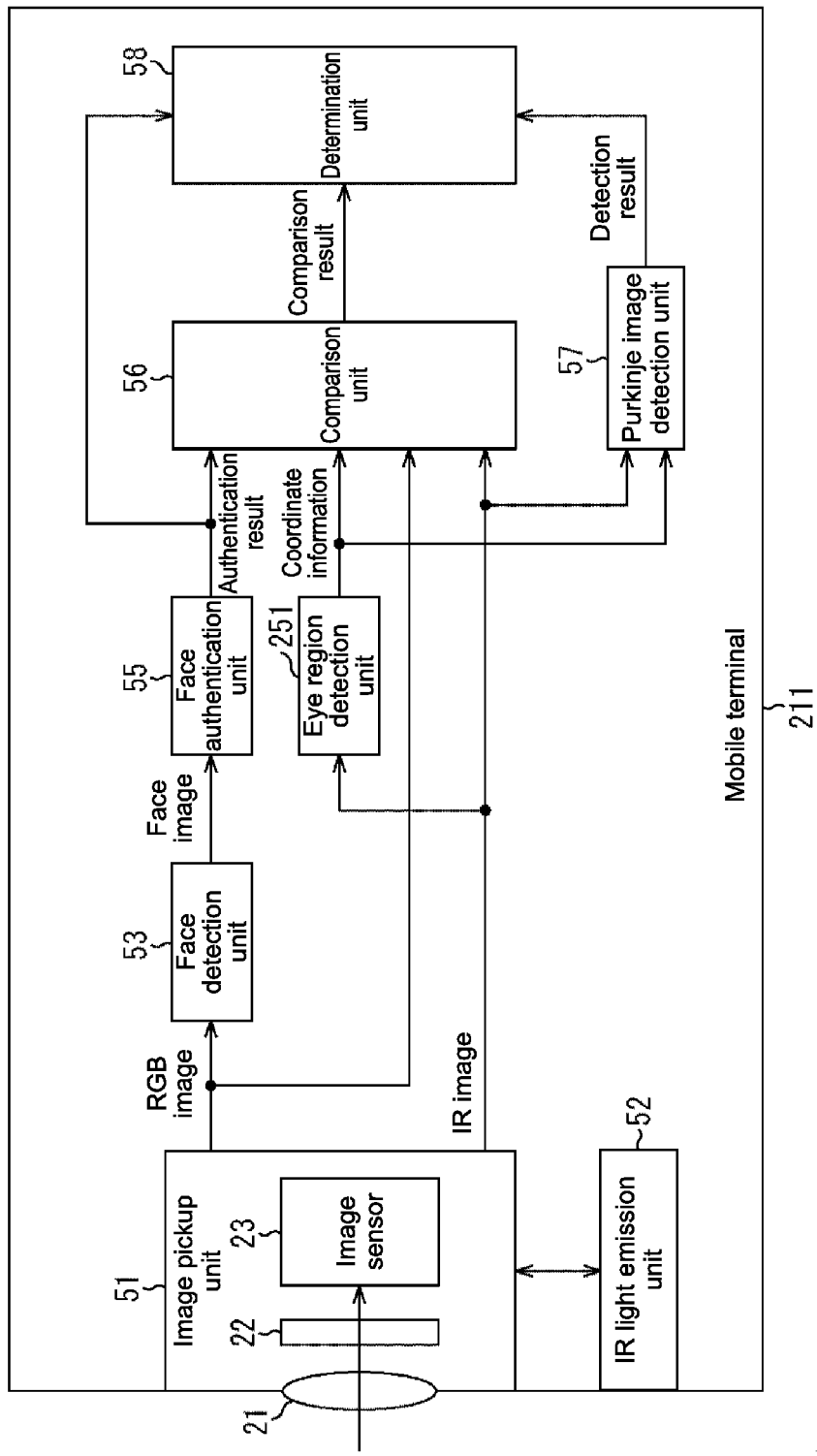
FIG. 14 is a block diagram showing an example of the functional structure of a mobile terminal according to a third embodiment of the present disclosure.

FIG. 14 is a diagram showing an example of the functional structure of a mobile terminal according to a third embodiment of the present disclosure.

It should be noted that in a mobile terminal 211 shown in FIG. 14, structures having the same functions as those in the mobile terminal 11 shown in FIG. 7 are denoted by the same names and reference numerals, and description thereof will be omitted as appropriate.

The mobile terminal 211 shown in FIG. 14 is different from the mobile terminal 11 shown in FIG. 7 in that an eye region detection unit 251 is provided instead of the eye region detection unit 54.

The eye region detection unit 251 detects an eye region from an IR image from the image pickup unit 51 and supplies coordinate information that indicates a position of the eye region in the IR image to the comparison unit 56 and the Purkinje image detection unit 57. The eye region detection unit 251 learns a plurality of eyes in advance, thereby detecting the eye region.

(About Authentication Process)

Subsequently, with reference to a flowchart shown in FIG. 15, an authentication process by the mobile terminal 211 shown in FIG. 14 will be described.

Figure 15:
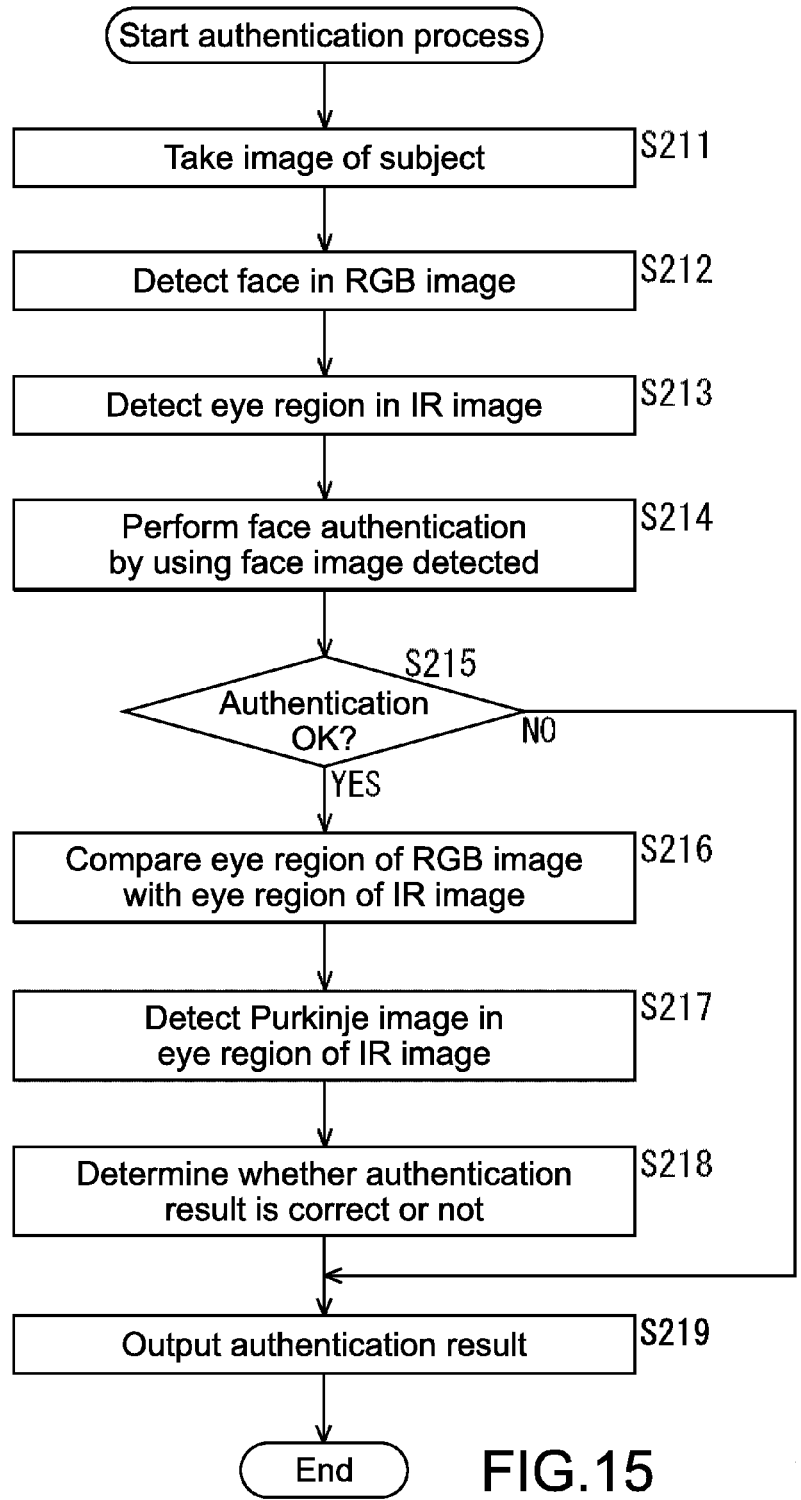
FIG. 15 is a flowchart for explaining an authentication process by the mobile terminal of FIG. 14.

It should be noted that the processes of Steps S211, S212, and S214 to S219 of the flowchart shown in FIG. 15 are basically the same as the processes of Steps S11, S12, and S14 to S19 of the flowchart shown in FIG. 8, so the description thereof will be omitted.

That is, in Step S213, the eye region detection unit 251 detects the eye region in the IR image obtained by the image pickup unit 51 and supplies coordination information that indicates the position of the eye region in the IR image to the comparison unit 56 and the Purkinje image detection unit 57. The detection of the eye region may be performed for each of the left eye and the right eye or for either one of the eyes.

Through the above process, the eye region in the RGB image and the eye region in the IR image are compared to each other, and whether the authentication result of the face authentication is correct or not is determined on the basis of the comparison result, so by the image taking that uses visible light and the image taking that uses infrared light, it is possible to increase the accuracy of the face authentication and further enhance the security by the face authentication.

It should be noted that, to the mobile terminal 211 shown in FIG. 14, a face detection unit that detects a face in the IR image from the image pickup unit 51, extracts a face image, and supplies the face image to the eye region detection unit 251 may be provided. With this structure, it is possible to reduce a load of the detection of the eye region by the eye region detection unit 251.

In the above description, the one image pickup unit takes the RGB image and the IR image, but two image pickup units may take the RGB image and the IR image, respectively.

5. Fourth Embodiment (Example of Functional Structure of Mobile Terminal)

Figure 16:
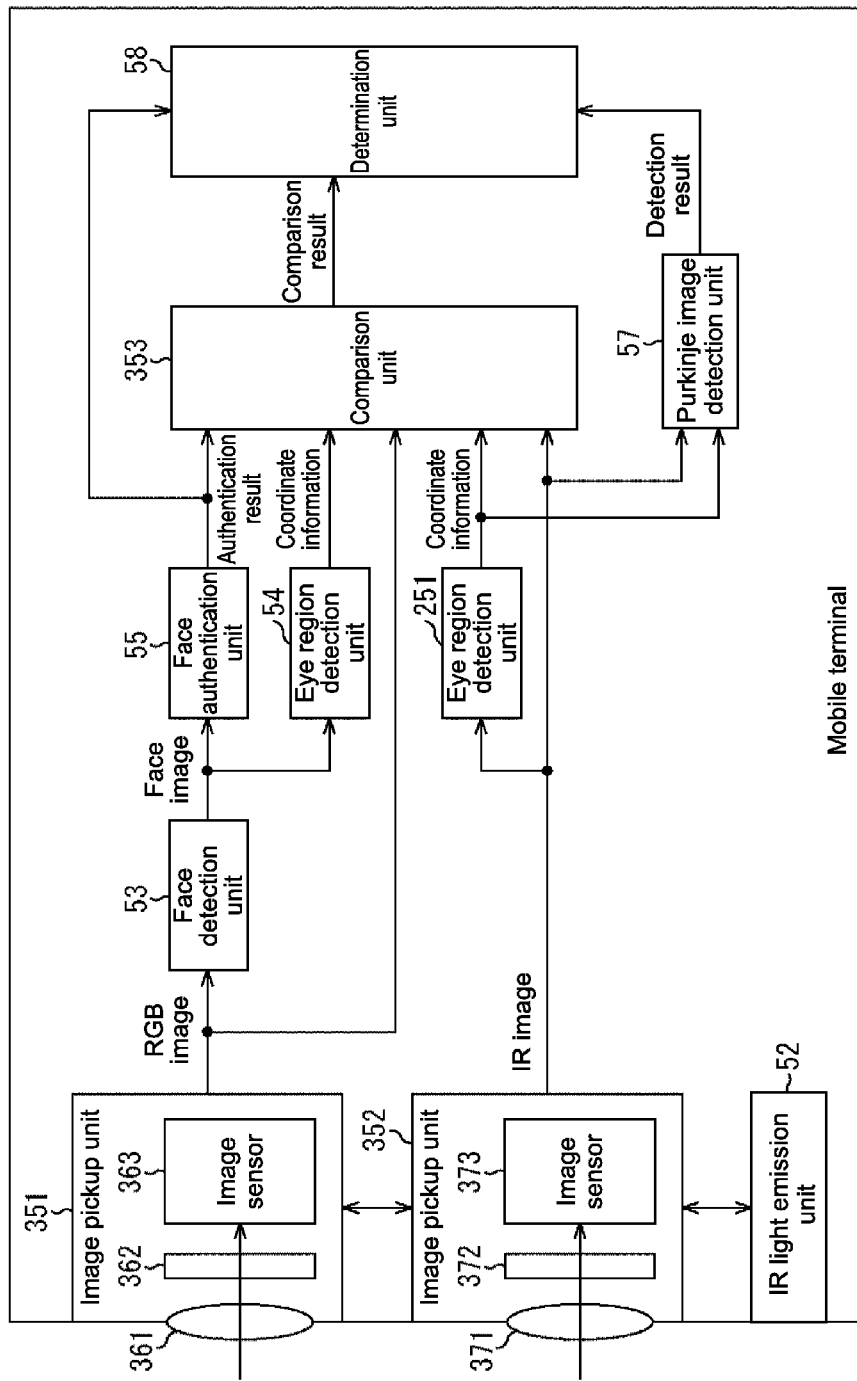
FIG. 16 is a block diagram showing an example of the functional structure of a mobile terminal according to a fourth embodiment of the present disclosure.

FIG. 16 is a diagram showing an example of the functional structure of a mobile terminal according to a fourth embodiment of the present disclosure.

It should be noted that in a mobile terminal 311 shown in FIG. 16, structures having the same functions as those in the mobile terminal 11 shown in FIG. 7 are denoted by the same names and reference numerals, and description thereof will be omitted as appropriate.

The mobile terminal 311 shown in FIG. 16 is different from the mobile terminal 11 shown in FIG. 7 in that image pickup units 351 and 352 are provided instead of the image pickup unit 51, an eye region detection unit 251 is newly provided, and a comparison unit 353 is provided instead of the comparison unit 56.

The eye region detection unit 251 is the same as that provided to the mobile terminal 211 shown in FIG. 14, so the description thereof will be omitted.

The image pickup unit 351 is provided with a lens 361, an IR cut filter 362, an image sensor 363, a CDS/AGC circuit (not shown), and an A/D conversion circuit (not shown). That is, the image pickup unit 351 takes an image of a subject and outputs an RGB image obtained.

The image pickup unit 352 is provided with a lens 371, a visible light cut filter 372, an image sensor 373, a CDS/AGC circuit (not shown), and an A/D conversion circuit (not shown). That is, the image pickup unit 352 takes an image of the subject and outputs an IR image obtained.

It should be noted that the image pickup units 351 and 352 and the IR light emission unit 52 are operated in synchronization with each other by a timing signal of the timing generator 28.

In the case where the authentication result that shows the authentication OK is supplied from the face authentication unit 55, the comparison unit 353 uses coordinate information from the eye region detection unit 54 and coordinate information from the eye region detection unit 251 to compare the eye region in the RGB image and the eye region in the IR image and supplies the comparison result to the determination unit 58.

(About Authentication Process)

Subsequently, with reference to a flowchart shown in FIG. 17, an authentication process by the mobile terminal 311 shown in FIG. 16 will be described.

Figure 17:
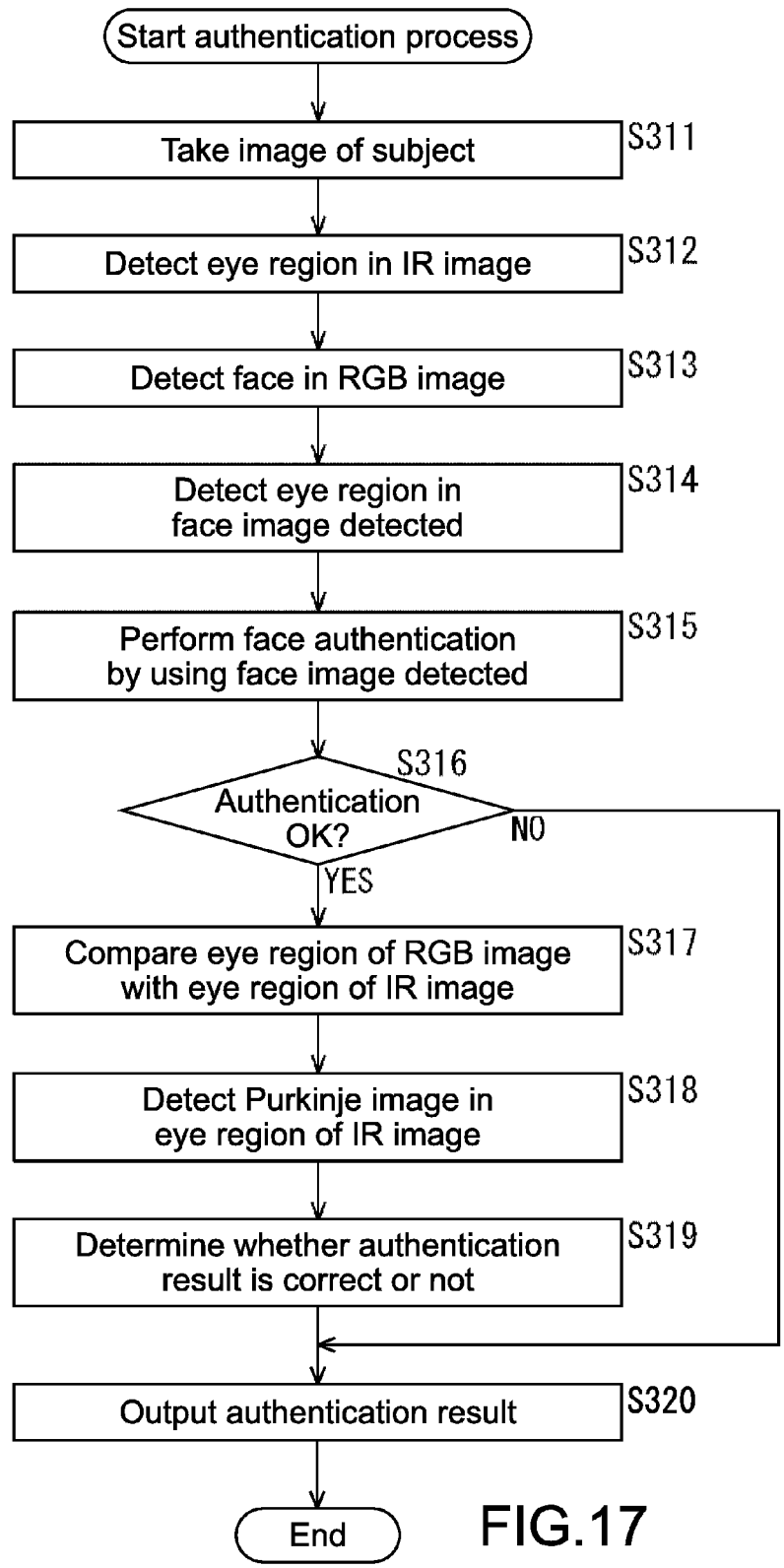
FIG. 17 is a flowchart for explaining an authentication process by the mobile terminal of FIG. 16.

It should be noted that the processes of Steps S314 to S316 and S318 to S320 of the flowchart shown in FIG. 17 are basically the same as the processes of Steps S13 to S15 and S17 to S19 of the flowchart shown in FIG. 8, so the description thereof will be omitted.

That is, in Step S311, the image pickup units 351 and 352 take images of an operator as a subject. Here, at timing when the image pickup units 351 and 352 take the images, the IR light emission unit 52 emits light. As a result, an RGB image and an IR image of the operator irradiated with the infrared light as the subject are obtained. The RGB image is supplied to the face detection unit 53 and the comparison unit 353, and the IR image is supplied to the Purkinje image detection unit 57, the eye region detection unit 251, and the comparison unit 353.

In Step S312, the eye region detection unit 251 detects the eye region in the IR image obtained by the image pickup unit 352 and supplies coordinate information that indicates the position of the eye region in the IR image to the Purkinje image detection unit 57 and the comparison unit 353.

Then, after the processes of Steps S313 to S316, in Step S317, the comparison unit 353 uses the coordinate information from the eye region detection unit 54 and the coordinate information from the eye region detection unit 251 to compare the eye region in the RGB image and the eye region in the IR image and supplies the comparison result to the determination unit 58. It should be noted that the coordinate information from the eye region detection unit 54 indicates the position of the eye region in the RGB image, and the coordinate information from the eye region detection unit 251 indicates the position in the eye region in the IR image. The RGB image and the IR image are taken at different field angles, so the position of the eye region in the RGB image and the position of the eye region in the IR image are specified with the positions adjusted by the different field angle.

It should be noted that for the method of obtaining the difference by comparing the eye region in the RGB image and the eye region in the IR image with each other, the methods described with reference to FIGS. 9 to 11 are used, for example.

Through the above process, the eye region in the RGB image and the eye region in the IR image are compared to each other, and whether the authentication result of the face authentication is correct or not is determined on the basis of the comparison result. Therefore, by the image taking that uses visible light and the image taking that uses the infrared light, it is possible to increase the accuracy of the face authentication and further enhance the security by the face authentication.

In the above description, the eye region in the IR image is detected from the entire IR image, but a face image may be extracted from the IR image to detect the eye region in the IR image from the face image.

6. Fifth Embodiment (Example of Functional Structure of Mobile Terminal)

Figure 18:
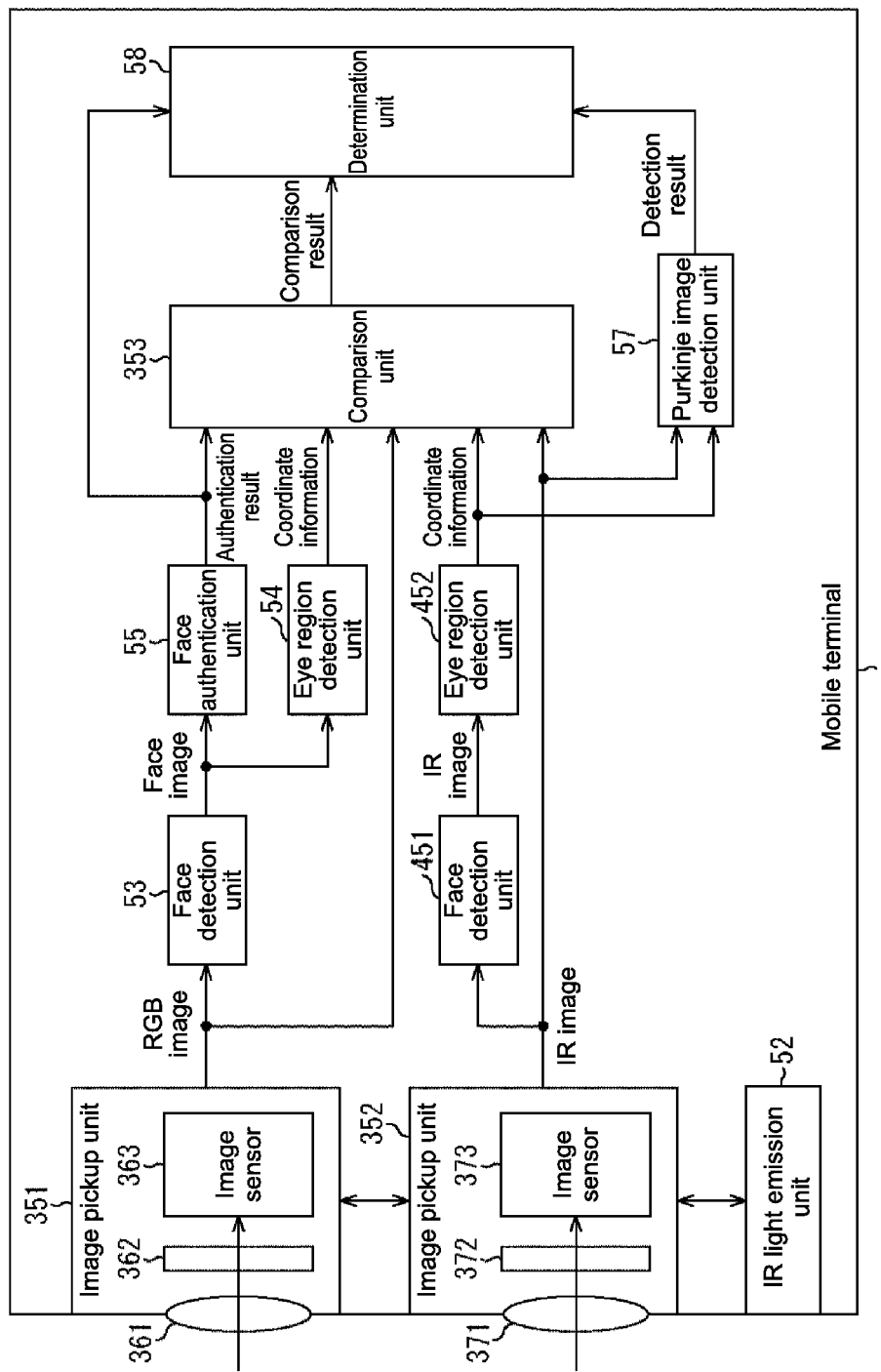
FIG. 18 is a block diagram showing an example of the functional structure of a mobile terminal according to a fifth embodiment of the present disclosure.

FIG. 18 is a diagram showing an example of the functional structure of a mobile terminal according to a fifth embodiment of the present disclosure.

It should be noted that in a mobile terminal 411 shown in FIG. 18, structures having the same functions as those in the mobile terminal 311 shown in FIG. 16 are denoted by the same names and reference numerals, and description thereof will be omitted as appropriate.

The mobile terminal 411 shown in FIG. 18 is different from the mobile terminal 311 shown in FIG. 16 in that a face detection unit 451 is newly provided, and an eye region detection unit 452 is provided instead of the eye region detection unit 251.

The face detection unit 451 detects a face in an IR image from the image pickup unit 352, extracts a face image on the basis of the position and the size of a face detection region where the face is detected, and supplies the face image to the eye region detection unit 452. It should be noted that in this case, to distinguish the face image extracted by the face detection unit 53 from the face image extracted by the face detection unit 451, the face image extracted by the face detection unit 53 and the face image extracted by the face detection unit 451 are referred to as an RGB face image and an IR face image, respectively.

The eye region detection unit 452 detects an eye region from the IR face image from the face detection unit 451 and supplies coordinate information that indicates the position of the eye region to the Purkinje image detection unit 57 and the comparison unit 353.

(About Authentication Process)

Subsequently, with reference to a flowchart shown in FIG. 19, an authentication process by the mobile terminal 411 shown in FIG. 18 will be described.

Figure 19:
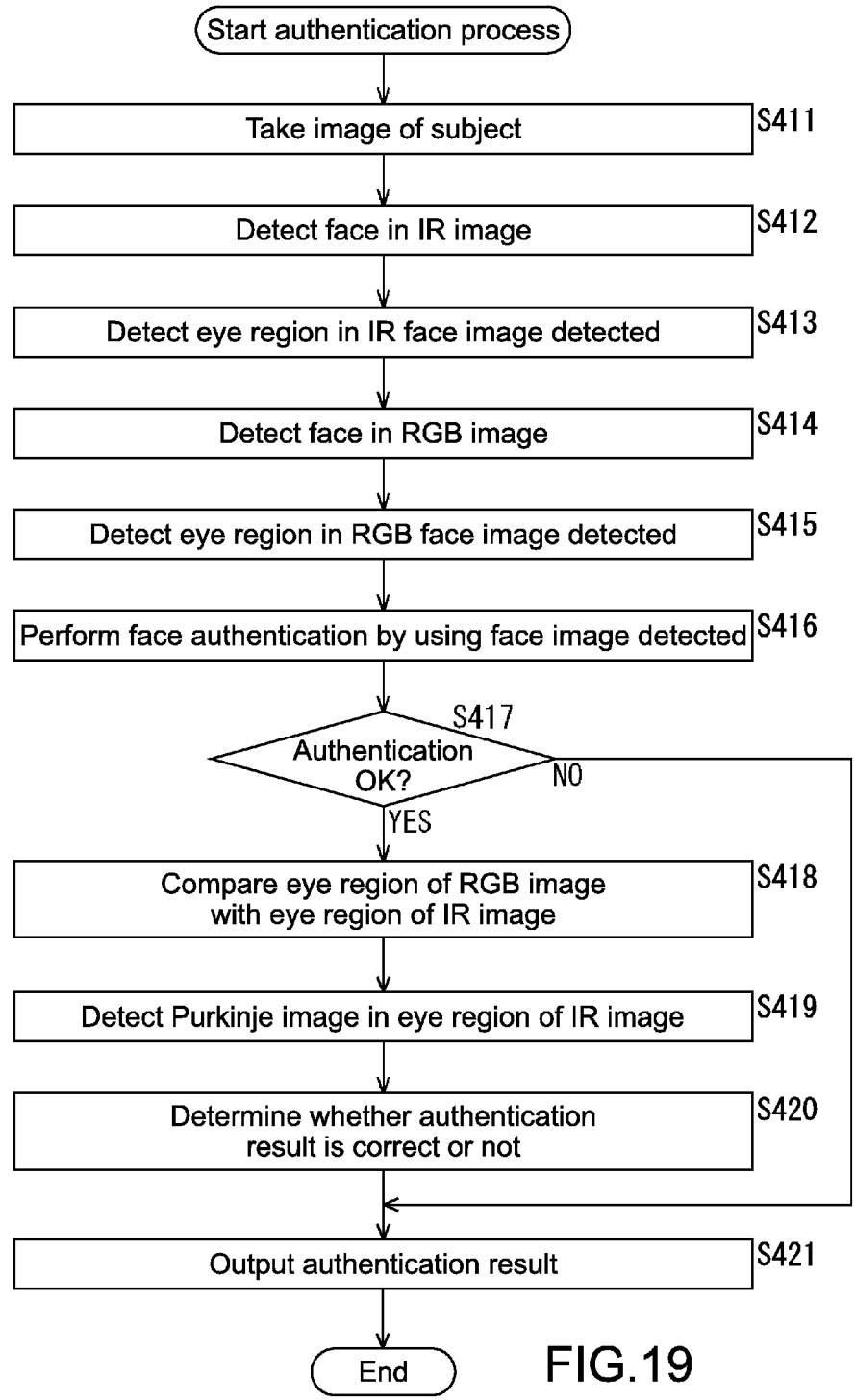
FIG. 19 is a flowchart for explaining an authentication process by the mobile terminal of FIG. 18.

It should be noted that the processes of Steps S411 and S414 to S421 of the flowchart shown in FIG. 19 are basically the same as the processes of Steps S311, S313 to S320 of the flowchart shown in FIG. 17, so the description thereof will be omitted.

That is, in Step S412, the face detection unit 451 detects a face in the IR image from the image pickup unit 352, extracts the IR face image on the basis of the position and the size of the face detection region, and supplies the IR face image to the eye region detection unit 452.

In step S413, the eye region detection unit 452 detects the eye region in the IR face image from the face detection unit 451 and supplies the coordinate information that indicates the position of the eye region in the IR image to the Purkinje image detection unit 57 and the comparison unit 353.

Through the above process, the eye region in the RGB image and the eye region in the IR image are compared to each other, and whether the authentication result of the face authentication is correct or not is determined on the basis of the comparison result, so by the image taking that uses the visible light and the image taking that uses the infrared light, it is possible to increase the accuracy of the face authentication and further enhance the security by the face authentication.

Further, the eye region in the IR image can be detected from the IR face image, so it is possible to increase the accuracy of the detection of the eye region and increase the accuracy of the adjustment of the field angle in the comparison unit 353.

In the above description, the two image pickup units take the RGB image and the IR image, respectively. However, by using an IR cut filter and a visible light cut filter in one image pickup unit while switching the cut filters, it is also possible to take the RGB image and the IR image.

7. Sixth Embodiment (Example of Functional Structure of Mobile Terminal)

Figure 20:
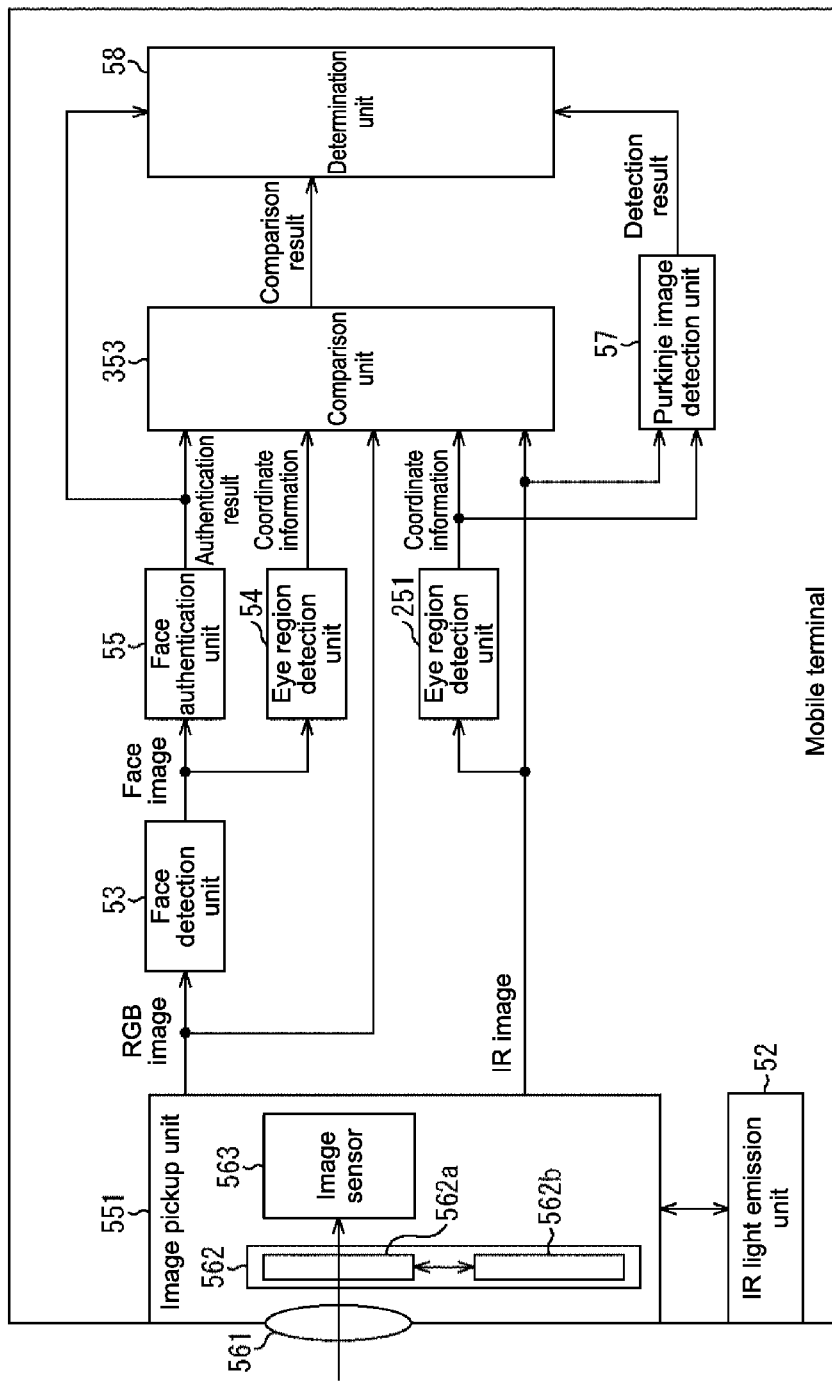
FIG. 20 is a block diagram showing an example of the functional structure of a mobile terminal according to a sixth embodiment of the present disclosure.

FIG. 20 is a diagram showing an example of the functional structure of a mobile terminal according to a sixth embodiment of the present disclosure.

It should be noted that in a mobile terminal 511 shown in FIG. 20, structures having the same functions as those in the mobile terminal 311 shown in FIG. 16 are denoted by the same names and reference numerals, and description thereof will be omitted as appropriate.

The mobile terminal 511 shown in FIG. 20 is different from the mobile terminal 311 shown in FIG. 16 in that an image pickup unit 551 is provided instead of the image pickup units 351 and 352.

The image pickup unit 551 is provided with a lens 561, a filter switching unit 562, and an image sensor 563. The filter switching unit 562 switches an optical filter, which is disposed between the lens 561 and the image sensor 563, between an IR cut filter 562a and a visible light cut filter 562b. With this structure, the image pickup unit 551 takes an image of a subject and outputs an RGB image and an IR image obtained. In this structure, the RGB image and the IR image are taken at the same field angle at different timings and obtained.

It should be noted that the IR light emission unit 52 may emit infrared light at a timing when the image pickup unit 551 takes the IR image.

(About Authentication Process)

Subsequently, with reference to a flowchart shown in FIG. 21, an authentication process by the mobile terminal 511 shown in FIG. 20 will be described.

Figure 21:
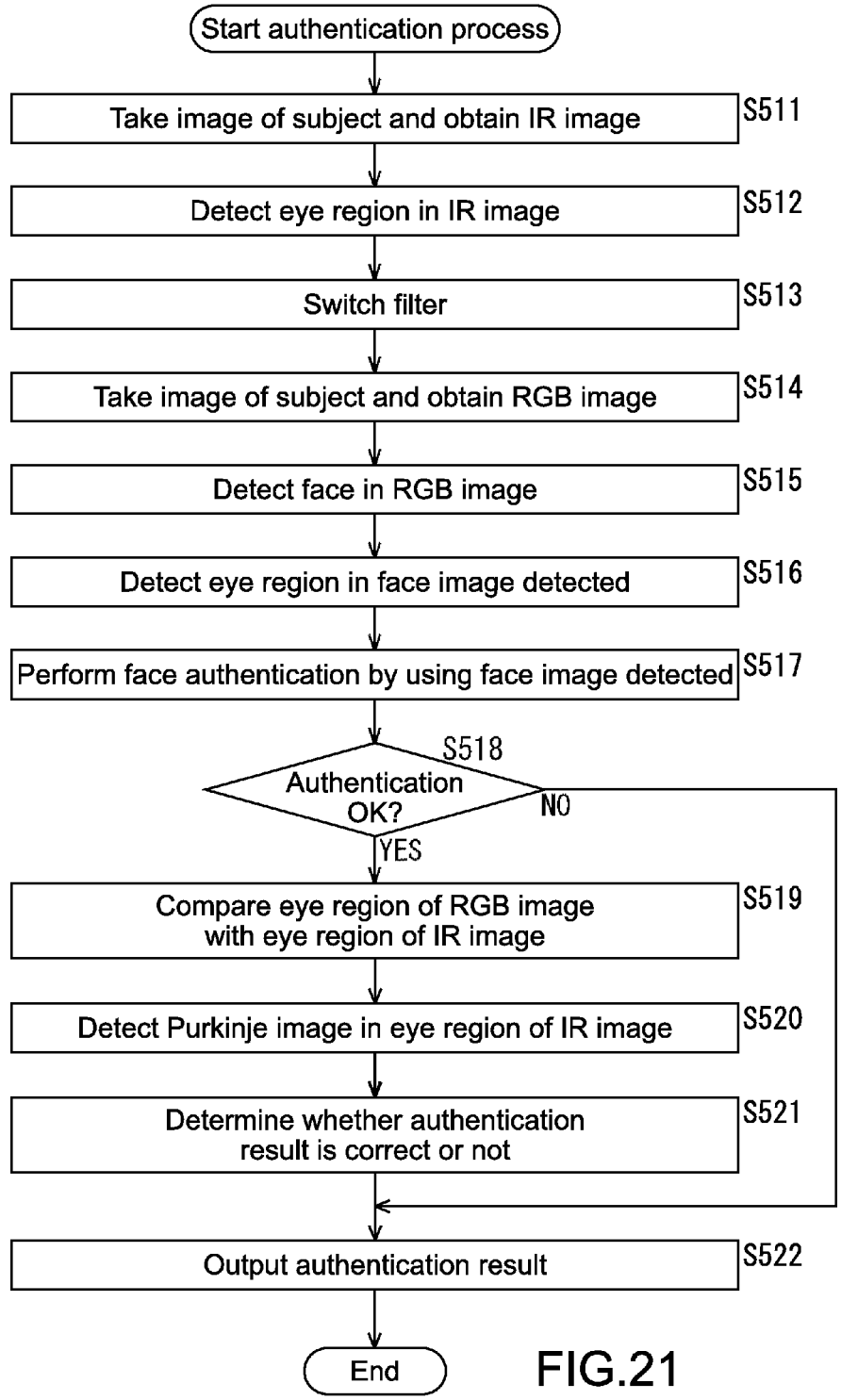
FIG. 21 is a flowchart for explaining an authentication process by the mobile terminal of FIG. 20.

It should be noted that the processes of Steps S515 to S522 of the flowchart shown in FIG. 21 are basically the same as the processes of Steps S313 to S320 of the flowchart shown in FIG. 17, so the description thereof will be omitted.

In Step S511, the image pickup unit 551 takes an image of an operator as a subject. At this time, the visible light cut filter 562b is disposed by the filter switching unit 562 between the lens 561 and the image sensor 563. Further, at the timing when the image pickup unit 551 takes the image, the IR light emission unit 52 emits light. As a result, an IR image of the operator irradiated with the infrared light as the subject is obtained, and the IR image is supplied to the Purkinje image detection unit 57, the eye region detection unit 251, and the comparison unit 353.

In Step S512, the eye region detection unit 251 detects the eye region in the IR image obtained by the image pickup unit 551 and supplies coordinate information that indicates the position of the eye region in the IR image to the Purkinje image detection unit 57 and the comparison unit 353.

In Step S513, the filter switching unit 562 switches the optical filter disposed between the lens 561 and the image sensor 563 from the visible light cut filter 562b to the IR cut filter 562b.

In Step S514, the image pickup unit 551 takes the image of the operator as the subject. At this time, the IR cut filter 562a is disposed between the lens 561 and the image sensor 563, so the RGB image of the operator as the subject is obtained, and the RGB image is supplied to the face detection unit 53 and the comparison unit 353.

Through the above process, the eye region in the RGB image and the eye region in the IR image are compared to each other, and whether the authentication result of the face authentication is correct or not is determined on the basis of the comparison result, so by the image taking that uses the visible light and the image taking that uses the infrared light, it is possible to increase the accuracy of the face authentication and further enhance the security by the face authentication.

It should be noted that in the authentication process described with reference to the flowchart shown in FIG. 21, the IR image is obtained, and then the RGB image is obtained, but the obtaining of the images may be performed in a reverse order.

In addition, to the mobile terminal 511 shown in FIG. 20, a face detection unit that detects a face in the IR image from the image pickup unit 511, extracts a face image, and supplies the face image to the eye region detection unit 251 may be provided. With this structure, it is possible to reduce a load of the detection of the eye region by the eye region detection unit 251.

8. Seventh Embodiment (Example of Functional Structure of Mobile Terminal)

Figure 22:
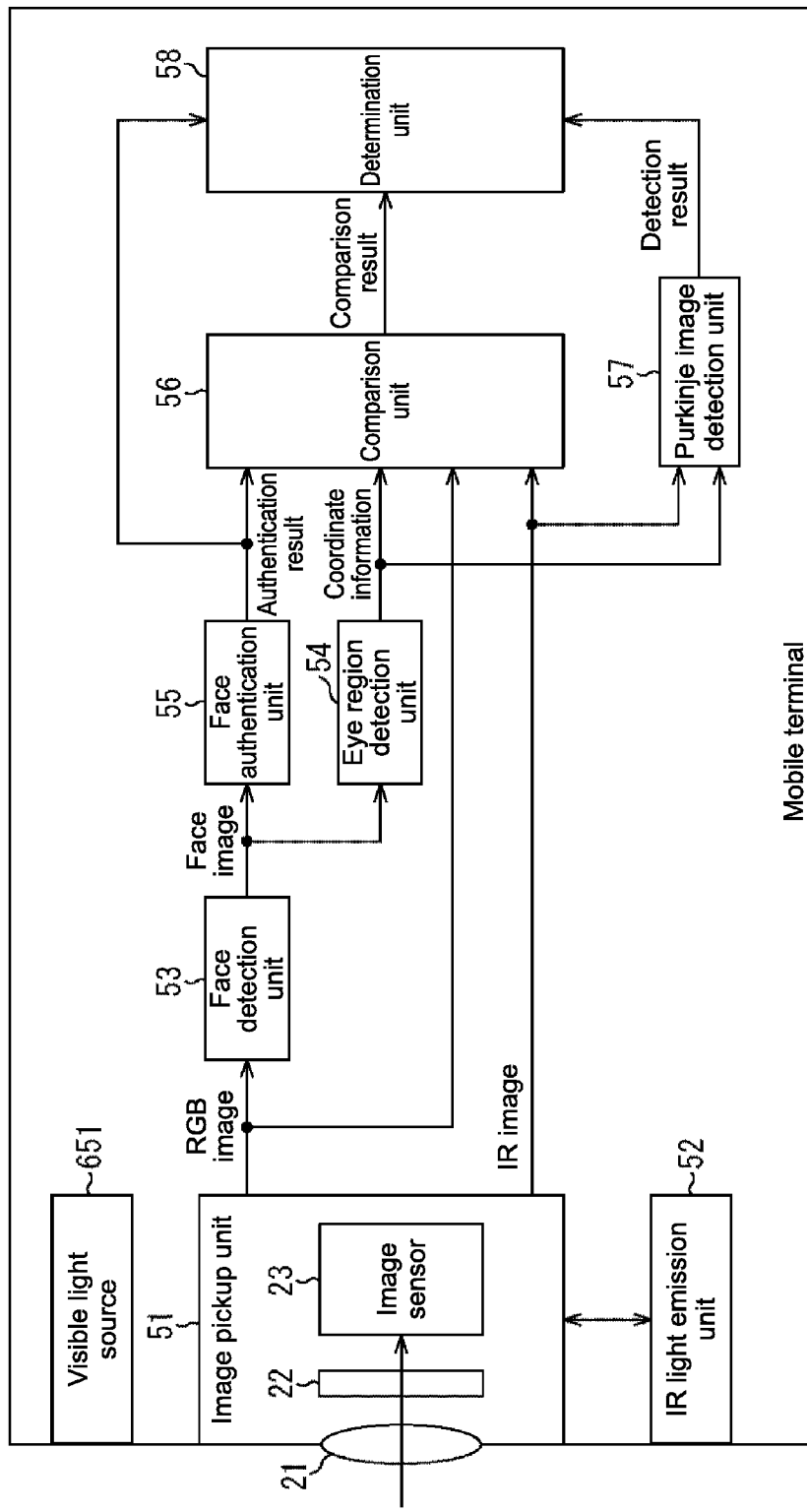
FIG. 22 is a block diagram showing an example of the functional structure of a mobile terminal according to a seventh embodiment of the present disclosure.

FIG. 22 is a diagram showing an example of the functional structure of a mobile terminal according to a seventh embodiment of the present disclosure.

It should be noted that in a mobile terminal 611 shown in FIG. 22, structures having the same functions as those in the mobile terminal 11 shown in FIG. 7 are denoted by the same names and reference numerals, and description thereof will be omitted as appropriate.

The mobile terminal 611 shown in FIG. 22 is different from the mobile terminal 11 shown in FIG. 7 in that a visible light source 651 is provided.

The visible light source 651 emits light at all times and irradiates the subject with visible light. It should be noted that the visible light source 651 may emit light at a timing when the image pickup unit 51 takes an image in synchronization with the image pickup unit 51 by the timing signal from the timing generator 28 and irradiate the subject with visible light.

With this structure, even if the authentication process is performed in a dark place, it is possible to perform the face authentication without lowering the accuracy.

It should be noted that the visible light source 651 can be added to the structures according to the second to sixth embodiments.

Further, in the above, the example in which the present technology is applied to the mobile terminal that unlocks the security lock by the face authentication is given. However, the present technology can be applied to any apparatus that performs face authentication by taking an image of a person as a subject. For example, the present technology can be applied to a personal computer that permits logon to a network by the face authentication, an entrance management system that permits entrance into facilities, an immigration control system that identify a passport, or the like.

The series of processes described above can be performed by hardware or software. In the case where the series of the processes are performed by the software, programs that form the software are installed to a computer incorporated in dedicated hardware or to a general-purpose personal computer or the like that can executes various functions by installing various programs from a program recording medium, for example.

Figure 23:
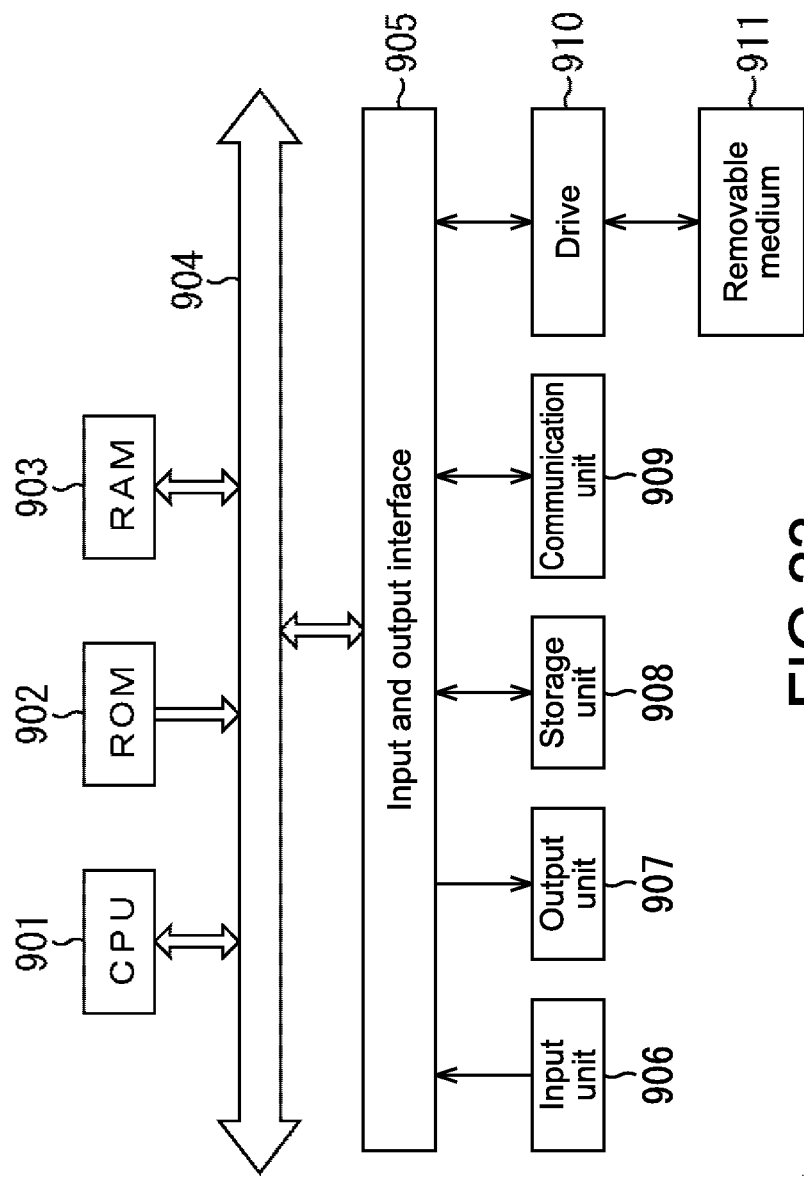
FIG. 23 is a block diagram showing an example of the hardware structure of a computer.

FIG. 23 is a block diagram showing an example of the hardware structure of a computer that performs the series of processes described above according to the program.

In the computer, a CPU (central processing unit) 901, a ROM (read only memory) 902, and a RAM (random access memory) 903 are connected to each other via a bus 904.

Further, to the bus 904, an input and output interface 905 is connected. To the input and output interface 905, an input unit 906 such as a keyboard, a mouse, and a microphone, an output unit 907 such as a display and a speaker, a storage unit 908 such as a hard disk and a non-volatile memory, a communication unit 909 such as a network interface, and a drive 910 that drives a removable medium 911 such as a magnetic disk, an optical disk, a magneto optical disk, and a semiconductor memory are connected.

In the computer having the structure described above, for example, the CPU 901 loads a program stored in the storage unit 908 to the RAM 903 via the input and output interface 905 and the bus 904 and executes the program, thereby performing the series of programs described above.

The program executed by the computer (CPU 901) is recorded in the removable medium 911 as a package medium formed of a magnetic disk (including a flexible disk), an optical disk (a CD-ROM (compact disc read only memory), a DVD (digital versatile disc), or the like), a magneto optical disk, or a semiconductor memory, or provided through a wired or wireless transmission medium such as a local area network, the Internet, and digital satellite broadcasting.

The removable medium 911 is mounted on the drive 910, with the result that the program can be installed in the storage unit 908 via the input and output interface 905. Further, the program can be received by the communication unit 909 through the wired or wireless transmission medium and can be installed in the storage unit 908. In addition, the program can be installed in advance in the ROM 902 or the storage unit 908.

It should be noted that the programs executed by the computer may be executed in chronological order and in the order of the description in the specification or may be executed in parallel or at timing when the programs are called, for example.

Further, the present disclosure is not limited to the above embodiments, and can be variously changed without departing from the gist of the present disclosure.

For example, the present technology can have a cloud computing structure in which one function is shared and processed by a plurality of apparatuses via a network.

In addition, the steps described in the above flowcharts can be carried out by one apparatus or can be shared and executed by a plurality of apparatuses.

In the case where one step includes a plurality of processes, the plurality of processes in the one step can be executed by one apparatus or shared and executed by a plurality of apparatuses.

It should be noted that the present disclosure can take at least the following configurations.

(Configuration 1)

An electronic device, comprising:

an imaging section comprising at least one image pickup unit, the imaging section being configured to image a scene and to generate a visible light image of the scene and an infrared light image of the scene;

a face authentication unit configured to perform a face authentication procedure on a face detected in the visible light image;

a verification unit configured to check an authentication determination of the face authentication unit by comparing the visible light image and the infrared light image.

(Configuration 2)

The electronic device of Configuration 1, wherein the verification unit is configured to check the authentication determination of the face authentication unit by comparing luminance data corresponding to an eye region in the visible light image with luminance data corresponding to an eye region in the infrared light image.

(Configuration 3)

The electronic device of Configuration 2, wherein the verification unit is configured to indicate that an authentication determination of the face authentication unit is suspect when a difference between the luminance data corresponding to the eye region in the visible light image and the luminance data corresponding to the eye region in the infrared light image is small.

(Configuration 4)

The electronic device of Configuration 3, wherein the luminance data corresponding to the eye region in the visible light image and the luminance data corresponding to the eye region in the infrared light image comprise binarized data.

(Configuration 5)

The electronic device of any one of Configurations 2 to 4, wherein the verification unit is configured to indicate that an authentication determination of the face authentication unit is suspect when a size of an iris region in the infrared light image is different from a size of an iris region in the visible light image.

(Configuration 6)

The electronic device of any one of Configurations 2 to 5, wherein the verification unit is configured to indicate that an authentication determination of the face authentication unit is suspect when a distribution of the luminance data corresponding to the eye region in the visible light image is different from a distribution of the luminance data corresponding to the eye region in the infrared light image.

(Configuration 7)

The electronic device of any one of Configurations 3 to 6, wherein the verification unit is configured to detect a Purkinje image in the eye region in the infrared light image and to indicate that an authentication determination of the face authentication unit is suspect when no Purkinje image is detected in the eye region in the infrared light image.

(Configuration 8)

The electronic device of any one of Configurations 2 to 7, wherein the at least one image pickup unit includes an image sensor that has visible light detection pixels that generate the visible light image and infrared light detection pixels that generate the infrared light image configured such that the visible light image and the infrared light image have the same field angle and are taken at the same time.

(Configuration 9)

The electronic device of Configuration 8, further comprising:

a face detection unit configured to detect a face in the visible light image and generate a face image therefrom; and an eye region detection unit configured to detect the eye region in the visible light image by searching the face image generated by the face detection unit and to output coordinates of the eye region in the visible light image to the verification unit, wherein the verification unit is configured to determine the eye region in the infrared light image based on the coordinates output by the eye region detection unit, and wherein the face authentication unit is configured to perform the face authentication procedure based on the face image generated by the face detection unit.

(Configuration 10)

The electronic apparatus of Configuration 8 or 9, further comprising an eye region detection unit configured to detect an eye region in the visible light image and to output coordinates of the eye region in the visible light image to the verification unit, wherein the verification unit is configured to determine the eye region in the infrared light image based on the coordinates output by the eye region detection unit.

(Configuration 11)

The electronic apparatus of any one of Configurations 8 to 10, further comprising an eye region detection unit configured to detect an eye region in the infrared light image and to output coordinates of the eye region in the infrared light image to the verification unit, wherein the verification unit is configured to determine the eye region in the visible light image based on the coordinates output by the eye region detection unit.

(Configuration 12)

The electronic device of any one of Configurations 2 to 11, wherein the at least one image pickup unit includes a first image pickup unit having a first image sensor that generates the visible light image and a second image pickup unit having a second image sensor that generates the infrared light image, the first and second image sensors being configured such that the visible light image and the infrared light image are taken at the same time.

(Configuration 13)

The electronic device of Configuration 12, further comprising:

a face detection unit configured to detect a face in the visible light image and generate a face image therefrom;

a first eye region detection unit configured to detect the eye region in the visible light image by searching the face image generated by the face detection unit and to output coordinates of the eye region in the visible light image to the verification unit; and a second eye region detection unit configured to detect the eye region in the infrared image, wherein the face authentication unit is configured to perform the face authentication procedure based on the face image generated by the face detection unit.

(Configuration 14)

The electronic device of Configuration 12 or 13, further comprising:

a first face detection unit configured to detect a face in the visible light image and generate a first face image therefrom;

a first eye region detection unit configured to detect the eye region in the visible light image by searching the first face image generated by the first face detection unit and to output coordinates of the eye region in the visible light image to the verification unit;

a second face detection unit configured to detect a face in the infrared light image and generate a second face image therefrom; and a second eye region detection unit configured to detect the eye region in the infrared light image by searching the second face image generated by the second face detection unit and to output coordinates of the eye region in the infrared light image to the verification unit, wherein the face authentication unit is configured to perform the face authentication procedure based on the first face image generated by the first face detection unit.

(Configuration 15)

The electronic device of any one of Configurations 2 to 14, wherein the at least one image pickup unit includes an image sensor and a filter unit configured to vary a filter over the image sensor such that the image sensor generates the visible light image at a first timing and generates the infrared light image at a second timing, the visible light image and the infrared light image having the same field angle.

(Configuration 16)

A mobile terminal apparatus comprising the electronic device of any one of Configurations 1 to 15.

(Configuration 17)

A mobile terminal apparatus comprising:

an imaging section comprising at least one image pickup unit, the imaging section being configured to image a scene and to generate a visible light image of the scene and an infrared light image of the scene;

a face authentication unit configured to perform a face authentication procedure on a face detected in the visible light image;

a verification unit configured to check an authentication determination of the face authentication unit by comparing the visible light image and the infrared light image.

(Configuration 18)
A computer system apparatus comprising the electronic device of any one of Configurations 1 to 15.
(Configuration 19)
A computer system apparatus comprising:
an imaging section comprising at least one image pickup unit, the imaging section being configured to image a scene and to generate a visible light image of the scene and an infrared light image of the scene;
a face authentication unit configured to perform a face authentication procedure on a face detected in the visible light image;
a verification unit configured to check an authentication determination of the face authentication unit by comparing the visible light image and the infrared light image.
(Configuration 20)
A security system apparatus comprising the electronic device of any one of Configurations 1 to 15.
(Configuration 21)
A security system apparatus comprising:
an imaging section comprising at least one image pickup unit, the imaging section being configured to image a scene and to generate a visible light image of the scene and an infrared light image of the scene;
a face authentication unit configured to perform a face authentication procedure on a face detected in the visible light image;
a verification unit configured to check an authentication determination of the face authentication unit by comparing the visible light image and the infrared light image.
(Configuration 22)
A method of authentication comprising:
imaging a scene and generating a visible light image of the scene and an infrared light image of the scene;
performing a face authentication procedure on a face detected in the visible light image; and
checking a result of said face authentication procedure by comparing luminance data corresponding to an eye region in the visible light image with luminance data corresponding to an eye region in the infrared light image.
(Configuration 23)
A non-transitory computer readable medium having program code stored thereon, the program code being executable by a processor to perform operations comprising:
imaging a scene and generating a visible light image of the scene and an infrared light image of the scene;
performing a face authentication procedure on a face detected in the visible light image; and
checking an result of said face authentication procedure by comparing luminance data corresponding to an eye region in the visible light image with luminance data corresponding to an eye region in the infrared light image.
(Configuration 24)
An electronic device, comprising:
a face authentication unit configured to perform a face authentication procedure on a face detected in a visible light image of a scene; and
a verification unit configured to check an authentication determination of the face authentication unit by comparing the visible light image to an infrared light image of the same scene.

(1) An authentication apparatus, including:
a comparison unit configured to compare an eye region of a person in a visible light image using the person as a subject and the eye region of the person in an infrared light image using the person as a subject, the person being irradiated with infrared light; and
a determination unit configured to determine whether an authentication result of face authentication performed for the person is correct or not on the basis of a comparison result obtained by the comparison unit.

(2) The authentication apparatus according to Item (1), in which
when a difference is caused between the eye region of the visible light image and the eye region in the infrared light image, the determination unit determines that the authentication result is correct.

(3) The authentication apparatus according to Item (1) or (2), further including
a face authentication unit configured to perform face authentication for the person in the visible light image, in which
the determination unit determines whether the authentication result obtained by the face authentication unit is correct or not on the basis of the comparison result obtained by the comparison unit.

(4) The authentication apparatus according to Item (3), further including
an image pickup unit configured to output the visible light image corresponding to visible light in light that is incident from a lens and the infrared light image corresponding to infrared light in light that is incident from the lens at the same time.

(5) The authentication apparatus according to Item (3) or (4), further including
an eye region detection unit configured to detect the eye region of one of the visible light image and the infrared light image, in which
the comparison unit uses coordinate information that indicates the eye region detected by the eye region detection unit to compare the eye region of the visible light image and the eye region of the infrared light image.

(6) The authentication apparatus according to Item (5), further including
a face detection unit configured to detect a face of the person in the visible light image, in which
the face authentication unit uses a face image of the face detected by the face detection unit to perform the face authentication for the person, and
the eye region detection unit detects the eye region in the face image of the face detected by the face detection unit.

(7) The authentication apparatus according to Item (3), further including:
a first image pickup unit configured to output the visible light image corresponding to visible light in light that is incident from a lens; and
a second image pickup unit configured to output the infrared light image corresponding to infrared light in light that is incident from the lens.

(8) The authentication apparatus according to Item (3) or (7), further including:
a first eye region detection unit configured to detect the eye region of the visible light image; and
a second eye region detection unit configured to detect the eye region of the infrared light image, in which
the comparison unit uses a first coordinate information and a second coordinate information to compare the eye region of the visible light image and the eye region of the infrared light image, the first coordinate information indicating the eye region of the visible light image detected by the first eye region detection unit, the second coordinate information indicating the eye region of the infrared light image detected by the second eye region detection unit.

(9) The authentication apparatus according to Item (8), further including:
a first face detection unit configured to detect a face of the person in the visible light image; and
a second face detection unit configured to detect a face of the person in the infrared light image, in which
the face authentication unit uses a face image of the face detected by the first face detection unit to perform face authentication for the person,
the first eye region detection unit detects the eye region in the face image of the face detected by the first face detection unit, and
the second eye region detection unit detects the eye region in a face image of the face detected by the second face detection unit.

(10) The authentication apparatus according to Item (3), further including
an image pickup unit configured to switch and use a first filter that blocks visible light and a second filter that blocks infrared light to output the visible light image corresponding to visible light in light that is incident from a lens and the infrared light image corresponding to infrared light in light that is incident from the lens.

(11) The authentication apparatus according to any one of Items (3) to (10), in which
the comparison unit performs binarization of the eye region of the visible light image and the eye region of the infrared light image to obtain a difference thereof.

(12) The authentication apparatus according to any one of Items (3) to (10), in which
the comparison unit obtains a difference between a brightness distribution in the eye region of the visible light image and a brightness distribution in the eye region of the infrared light image.

(13) The authentication apparatus according to any one of Items (3) to (10), in which
the comparison unit obtains a difference between an outline of a black region in the eye region of the visible light image and an outline of a black region in the eye region of the infrared light image.

(14) The authentication apparatus according to any one of Items (3) to (13), further including
a Purkinje image detection unit configured to detect a Purkinje image in the eye region of the infrared light image, in which
the determination unit uses a comparison result obtained by the comparison unit and a detection result obtained by the Purkinje image detection unit to determine whether an authentication result of the face authentication performed for the person is correct or not.

(15) The authentication apparatus according to any one of Items (3) to (14), further including
an infrared light emission unit configured to emit the infrared light with which the person is irradiated.

(16) The authentication apparatus according to any one of Items (3) to (15), further including
a visible light source configured to emit visible light to the person.

(17) An authentication method, including:
comparing an eye region of a person in a visible light image using the person as a subject and the eye region of the person in an infrared light image using the person as a subject, the person being irradiated with infrared light; and
determining whether an authentication result of face authentication performed for the person is correct or not on the basis of a comparison result obtained by the comparing.

(18) A program causing a computer to execute a process including
comparing an eye region of a person in a visible light image using the person as a subject and the eye region of the person in an infrared light image using the person as a subject, the person being irradiated with infrared light, and
determining whether an authentication result of face authentication performed for the person is correct or not on the basis of a comparison result obtained by the comparing.

The present disclosure contains subject matter related to that disclosed in Japanese Priority Patent Application JP 2012-223794 filed in the Japan Patent Office on Oct. 9, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device, comprising:
an imaging section comprising at least one image pickup unit, the imaging section being configured to image a scene and to generate a visible light image of the scene and an infrared light image of the scene;
a face authentication unit configured to perform a face authentication procedure on a face detected in the visible light image; and
a verification unit configured to check an authentication determination of the face authentication unit by comparing the visible light image and the infrared light image, wherein
the verification unit is configured to check the authentication determination of the face authentication unit by comparing luminance data corresponding to an eye region in the visible light image with luminance data corresponding to an eye region in the infrared light image,
the verification unit is configured to indicate that the authentication determination of the face authentication unit is suspect when a difference between the luminance data corresponding to the eye region in the visible light image and the luminance data corresponding to the eye region in the infrared light image is small, and
the verification unit is configured to detect a Purkinje image in the eye region in the infrared light image and to indicate that an authentication determination of the face authentication unit is suspect when no Purkinje image is detected in the eye region in the infrared light image.

2. The electronic device of claim 1, wherein the luminance data corresponding to the eye region in the visible light image and the luminance data corresponding to the eye region in the infrared light image comprise binarized data.

3. The electronic device of claim 1, wherein the verification unit is configured to indicate that an authentication determination of the face authentication unit is suspect when a size of an iris region in the infrared light image is different from a size of an iris region in the visible light image.

4. The electronic device of claim 1, wherein the verification unit is configured to indicate that an authentication determination of the face authentication unit is suspect when a distribution of the luminance data corresponding to the eye region in the visible light image is different from a distribution of the luminance data corresponding to the eye region in the infrared light image.

5. The electronic device of claim 1, wherein the at least one image pickup unit includes an image sensor that has visible light detection pixels that generate the visible light image and infrared light detection pixels that generate the infrared light image configured such that the visible light image and the infrared light image have the same field angle and are taken at the same time.

6. The electronic device of claim 5, further comprising:
a face detection unit configured to detect a face in the visible light image and generate a face image therefrom; and
an eye region detection unit configured to detect the eye region in the visible light image by searching the face image generated by the face detection unit and to output coordinates of the eye region in the visible light image to the verification unit, wherein
the verification unit is configured to determine the eye region in the infrared light image based on the coordinates output by the eye region detection unit, and
the face authentication unit is configured to perform the face authentication procedure based on the face image generated by the face detection unit.

7. The electronic apparatus of claim 5,
further comprising an eye region detection unit configured to detect an eye region in the visible light image and to output coordinates of the eye region in the visible light image to the verification unit, wherein
the verification unit is configured to determine the eye region in the infrared light image based on the coordinates output by the eye region detection unit.

8. The electronic apparatus of claim 5,
further comprising an eye region detection unit configured to detect an eye region in the infrared light image and to output coordinates of the eye region in the infrared light image to the verification unit, wherein
the verification unit is configured to determine the eye region in the visible light image based on the coordinates output by the eye region detection unit.

9. The electronic device of claim 1, wherein the at least one image pickup unit includes a first image pickup unit having a first image sensor that generates the visible light image and a second image pickup unit having a second image sensor that generates the infrared light image, the first and second image sensors being configured such that the visible light image and the infrared light image are taken at the same time.

10. An electronic device, comprising:
an imaging section comprising at least one image pickup unit, the imaging section being configured to image a scene and to generate a visible light image of the scene and an infrared light image of the scene;
a face authentication unit configured to perform a face authentication procedure on a face detected in the visible light image;
a verification unit configured to check an authentication determination of the face authentication unit by comparing the visible light image and the infrared light image;
a face detection unit configured to detect a face in the visible light image and generate a face image therefrom;
a first eye region detection unit configured to detect the eye region in the visible light image by searching the face image generated by the face detection unit and to output coordinates of the eye region in the visible light image to the verification unit; and a second eye region detection unit configured to detect the eye region in the infrared image, wherein
the verification unit is configured to check the authentication determination of the face authentication unit by comparing luminance data corresponding to an eye region in the visible light image with luminance data corresponding to an eye region in the infrared light image,
the verification unit is configured to indicate that an authentication determination of the face authentication unit is suspect when a difference between the luminance data corresponding to the eye region in the visible light image and the luminance data corresponding to the eye region in the infrared light image is small, and
the face authentication unit is configured to perform the face authentication procedure based on the face image generated by the face detection unit.

11. An electronic device, comprising:
an imaging section comprising at least one image pickup unit, the imaging section being configured to image a scene and to generate a visible light image of the scene and an infrared light image of the scene;
a face authentication unit configured to perform a face authentication procedure on a face detected in the visible light image;
a verification unit configured to check an authentication determination of the face authentication unit by comparing the visible light image and the infrared light image;
a first face detection unit configured to detect a face in the visible light image and generate a first face image therefrom;
a first eye region detection unit configured to detect the eye region in the visible light image by searching the first face image generated by the first face detection unit and to output coordinates of the eye region in the visible light image to the verification unit;
a second face detection unit configured to detect a face in the infrared light image and generate a second face image therefrom; and
a second eye region detection unit configured to detect the eye region in the infrared light image by searching the second face image generated by the second face detection unit and to output coordinates of the eye region in the infrared light image to the verification unit, wherein
the verification unit is configured to check the authentication determination of the face authentication unit by comparing luminance data corresponding to an eye region in the visible light image with luminance data corresponding to an eye region in the infrared light image,
the verification unit is configured to indicate that an authentication determination of the face authentication unit is suspect when a difference between the luminance data corresponding to the eye region in the visible light image and the luminance data corresponding to the eye region in the infrared light image is small, and
the face authentication unit is configured to perform the face authentication procedure based on the first face image generated by the first face detection unit.

12. The electronic device of claim 1, wherein the at least one image pickup unit includes an image sensor and a filter unit configured to vary a filter over the image sensor such that the image sensor generates the visible light image at a first timing and generates the infrared light image at a second timing, the visible light image and the infrared light image having the same field angle.

13. A mobile terminal apparatus comprising the electronic device of claim 1.

14. A computer system apparatus comprising the electronic device of claim 1.

15. A security system apparatus comprising the electronic device of claim 1.

16. A method of authentication comprising:
- imaging a scene and generating a visible light image of the scene and an infrared light image of the scene;
- performing a face authentication procedure on a face detected in the visible light image; and
- checking a result of said face authentication procedure by comparing luminance data corresponding to an eye region in the visible light image with luminance data corresponding to an eye region in the infrared light image;
- indicating that an authentication determination of a face authentication unit is suspect when a difference between the luminance data corresponding to the eye region in the visible light image and the luminance data corresponding to the eye region in the infrared light image is small; and
- detecting a Purkinje image in the eye region in the infrared light image and to indicate that the authentication determination of the face authentication unit is suspect when no Purkinje image is detected in the eye region in the infrared light image.

17. A non-transitory computer readable medium having program code stored thereon, the program code being executable by a processor to perform operations comprising:
- imaging a scene and generating a visible light image of the scene and an infrared light image of the scene;
- performing a face authentication procedure on a face detected in the visible light image; and
- checking an result of said face authentication procedure by comparing luminance data corresponding to an eye region in the visible light image with luminance data corresponding to an eye region in the infrared light image;
- indicating that an authentication determination of a face authentication unit is suspect when a difference between the luminance data corresponding to the eye region in the visible light image and the luminance data corresponding to the eye region in the infrared light image is small; and
- detecting a Purkinje image in the eye region in the infrared light image and to indicate that the authentication determination of the face authentication unit is suspect when no Purkinje image is detected in the eye region in the infrared light image.

18. An electronic device, comprising:
- a face authentication unit configured to perform a face authentication procedure on a face detected in a visible light image of a scene; and
- a verification unit configured to check an authentication determination of the face authentication unit by comparing the visible light image to an infrared light image of the same scene, wherein
- the verification unit is configured to check the authentication determination of the face authentication unit by comparing luminance data corresponding to an eye region in the visible light image with luminance data corresponding to an eye region in the infrared light image,
- the verification unit is configured to indicate that the authentication determination of the face authentication unit is suspect when a difference between the luminance data corresponding to the eye region in the visible light image and the luminance data corresponding to the eye region in the infrared light image is small, and
- the verification unit is configured to detect a Purkinje image in the eye region in the infrared light image and to indicate that an authentication determination of the face authentication unit is suspect when no Purkinje image is detected in the eye region in the infrared light image.

* * * * *